US012786810B2

(12) United States Patent
Vijayakumar et al.

(10) Patent No.: US 12,786,810 B2
(45) Date of Patent: Nov. 3, 2026

(54) CELLULAR FIELD TESTING AUTOMATION TOOL: AUTOMATED COMMUNICATION CHANNEL HANDOVER

(71) Applicant: Boost SubscriberCo L.L.C., Englewood, CO (US)

(72) Inventors: Nikhil Rangaraajan Vijayakumar, Littleton, CO (US); Andrew Allan, Littleton, CO (US); In-Kyung Kim, Highlands Ranch, CO (US)

(73) Assignee: Boost SubscriberCo L.L.C., Englewood, CO (US)

( * ) Notice: Subject to any disclaimer, the term of this patent is extended or adjusted under 35 U.S.C. 154(b) by 248 days.

(21) Appl. No.: 18/395,237

(22) Filed: Dec. 22, 2023

(65) Prior Publication Data

US 2025/0212067 A1 Jun. 26, 2025

(51) Int. Cl.
*H04W 36/00* (2009.01)
*H04W 24/08* (2009.01)
*H04W 36/14* (2009.01)

(52) U.S. Cl.
CPC ....... *H04W 36/0058* (2018.08); *H04W 24/08* (2013.01); *H04W 36/144* (2023.05)

(58) Field of Classification Search
CPC ......................... H04W 36/0058; H04W 24/08; H04W 36/144

(Continued)

(56) References Cited

U.S. PATENT DOCUMENTS 11,076,346 B2 7/2021 Chinbe et al.
11,765,789 B1 * 9/2023 Zheng .................. G06F 18/214 714/25

(Continued)

FOREIGN PATENT DOCUMENTS

CN 102595435 B 8/2015

OTHER PUBLICATIONS

Nikhil Rangaraajan Vijayakumar et al., "Cellular Field Testing Automation Tool," U.S. Appl. No. 18/228,848, filed Aug. 1, 2023. (38 Pages).

(Continued)

*Primary Examiner* — Kwang B Yao
*Assistant Examiner* — Syed M Bokhari
(74) *Attorney, Agent, or Firm* — Kipman T. Werking; Frontier IP Law PLLC

(57) ABSTRACT

A disclosed method may include (i) initiating a cellular field testing tool that tests a condition of cellular network connectivity of a device under test, (ii) detecting first results of performing a first series of communication channel handover procedures at a device under test, (iii) detecting second results of performing a second series of communication channel handover procedures at a reference device, (iv) outputting, by the cellular field testing tool, an indication of whether the device under test passed or failed the first series of communication channel handover procedures at least in part by comparing the first results of the first series of communication channel handover procedures at the device under test with the second results of the second series of communication channel handover procedures at the reference device. Related systems and computer-readable mediums are further disclosed.

20 Claims, 24 Drawing Sheets

(58) Field of Classification Search
USPC .......................................................... 370/331
See application file for complete search history.

(56) References Cited

U.S. PATENT DOCUMENTS

| | | | | |
|---|---|---|---|---|
| 12,363,566 | B2 * | 7/2025 | Naseef | G01R 29/105 |
| 2005/0272445 | A1 | 12/2005 | Zellner | |
| 2012/0035904 | A1 * | 2/2012 | Seckendorf | H04W 16/22<br>703/21 |
| 2014/0105058 | A1 | 4/2014 | Hu et al. | |
| 2014/0187172 | A1 * | 7/2014 | Partee | H04H 20/12<br>455/67.12 |
| 2014/0280904 | A1 | 9/2014 | Bugenhagen | |
| 2015/0140956 | A1 | 5/2015 | Prewitt et al. | |
| 2015/0189525 | A1 * | 7/2015 | Schmidt | H04W 24/08<br>455/436 |
| 2015/0264591 | A1 | 9/2015 | Baeder | |
| 2016/0227423 | A1 | 8/2016 | Bahr | |
| 2016/0277939 | A1 | 9/2016 | Bertrand et al. | |
| 2016/0373944 | A1 | 12/2016 | Jain et al. | |
| 2017/0195357 | A1 | 7/2017 | Sundhar et al. | |
| 2017/0214734 | A1 | 7/2017 | Sun | |
| 2017/0317907 | A1 | 11/2017 | Chinbe et al. | |
| 2018/0084380 | A1 | 3/2018 | Lucas | |
| 2019/0215707 | A1 | 7/2019 | Jackson | |
| 2019/0377027 | A1 | 12/2019 | Rivoir | |
| 2021/0326680 | A1 * | 10/2021 | Chaaraoui | G06N 3/048 |
| 2021/0385646 | A1 | 12/2021 | Liu et al. | |
| 2022/0140919 | A1 | 5/2022 | Linkola | |
| 2023/0370874 | A1 | 11/2023 | Wu | |
| 2023/0380012 | A1 | 11/2023 | Zheng | |
| 2024/0187958 | A1 | 6/2024 | Yan et al. | |
| 2024/0361469 | A1 | 10/2024 | Dupray et al. | |

OTHER PUBLICATIONS

Nikhil Rangaraajan Vijayakumar, "Cellular Field Testing Automation Tool: Pass Fail Analysis and Test Scenario Recovery," U.S. Appl. No. 18/385,297, filed Oct. 30, 2023. (52 Pages).

Nikhil Rangaraajan Vijayakumar et al., "Cellular Field Testing Automation Tool: Automation of Emergency Location Accuracy Improvements," U.S. Appl. No. 18/540,581, filed Dec. 14, 2023. (46 Pages).

Nikhil Rangaraajan Vijayakumar et al., "Cellular Field Testing Automation Tool Including Carrier Aggregation Combination Alignment," U.S. Appl. No. 18/535,795, filed Dec. 11, 2023. (47 Pages).

Nikhil Rangaraajan Vijayakumar et al., "Cellular Field Testing Automation Tool Including Network Conditions Monitor, Audible and Visible Conclusion Alarms, and Data Stalls," U.S. Appl. No. 18/397,781, filed Dec. 27, 2023. (60 Pages).

* cited by examiner

CELLULAR FIELD TESTING AUTOMATION TOOL: AUTOMATED COMMUNICATION CHANNEL HANDOVER

BRIEF SUMMARY

This disclosure is generally directed to a cellular field testing automation tool and improvements thereof. In one example, a method includes (i) initiating a cellular field testing tool that tests a condition of cellular network connectivity of a device under test, (ii) detecting first results of performing a first series of communication channel handover procedures at the device under test, (iii) detecting second results of performing a second series of communication channel handover procedures at a reference device, and (iv) outputting, by the cellular field testing tool, an indication of whether the device under test passed or failed the first series of communication channel handover procedures at least in part by comparing the first results of the first series of communication channel handover procedures at the device under test with the second results of the second series of communication channel handover procedures at the reference device.

In some examples, the first series of communication channel handover procedures or the second series of communication channel handover procedures involve handover procedures between Wi-Fi and another communication channel.

In some examples, the first series of communication channel handover procedures or the second series of communication channel handover procedures involve handover procedures between new radio and another communication channel.

In some examples, decoding a packet header to identify a type of radio access technology acts as a start criterion for beginning the first series of communication channel handover procedures.

In some examples, wherein a key performance indicator is measured based on at least one of monitoring failure messages in IP Multimedia Core Network Subsystem signaling, monitoring a registered radio access technology used by an instance of user equipment, or monitoring for call drops.

In some examples, at least one instance within the first series of communication channel handover procedures is labeled as a failure upon detecting either a call drop or an occurrence of an IP Multimedia Core Network Subsystem error code.

In some examples, outputting, by the cellular field testing tool, the indication of whether the device under test passed or failed comprises comparing a first ratio indicating failed iterations within the first series of communication channel handover procedures and a second ratio indicating failed iterations within the second series of communication channel handover procedures.

In some examples, outputting, by the cellular field testing tool, the indication of whether the device under test passed or failed comprises detecting whether the first ratio is within a threshold percent from the second ratio.

In some examples, the first series of communication channel handover procedures comprises attempting to switch from the first communication channel to a second communication channel, checking whether the attempting to switch to the second communication channel was successful, attempting switching from the second communication channel to the first communication channel, and checking whether the attempting to switching to the first communication channel was successful.

In some examples, the method further includes repeating the method above at least once and saving output results and generating a report with a latency measurement and a pass/fail percentage.

In some examples, a system may include (i) a physical computing processor and (ii) a non-transitory computer-readable medium encoding instructions that, when executed by the physical computing processor, cause a computing device to perform operations comprising (a) initiating a cellular field testing tool that tests a condition of cellular network connectivity of a device under test, (b) detecting first results of performing a first series of communication channel handover procedures at the device under test, (c) detecting second results of performing a second series of communication channel handover procedures at a reference device, and (d) outputting, by the cellular field testing tool, an indication of whether the device under test passed or failed the first series of communication channel handover procedures at least in part by comparing the first results of the first series of communication channel handover procedures at the device under test with the second results of the second series of communication channel handover procedures at the reference device.

In one example, a computer-readable medium encodes instructions that, when executed by a physical processor of a computing device, cause the computing device to perform operations including (i) initiating a cellular field testing tool that tests a condition of cellular network connectivity of a device under test, (ii) detecting first results of performing a first series of communication channel handover procedures at the device under test, (iii) detecting second results of performing a second series of communication channel handover procedures at a reference device, and (iv) outputting, by the cellular field testing tool, an indication of whether the device under test passed or failed the first series of communication channel handover procedures at least in part by comparing the first results of the first series of communication channel handover procedures at the device under test with the second results of the second series of communication channel handover procedures at the reference device.

BRIEF DESCRIPTION OF THE DRAWINGS

For a better understanding of the present invention, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
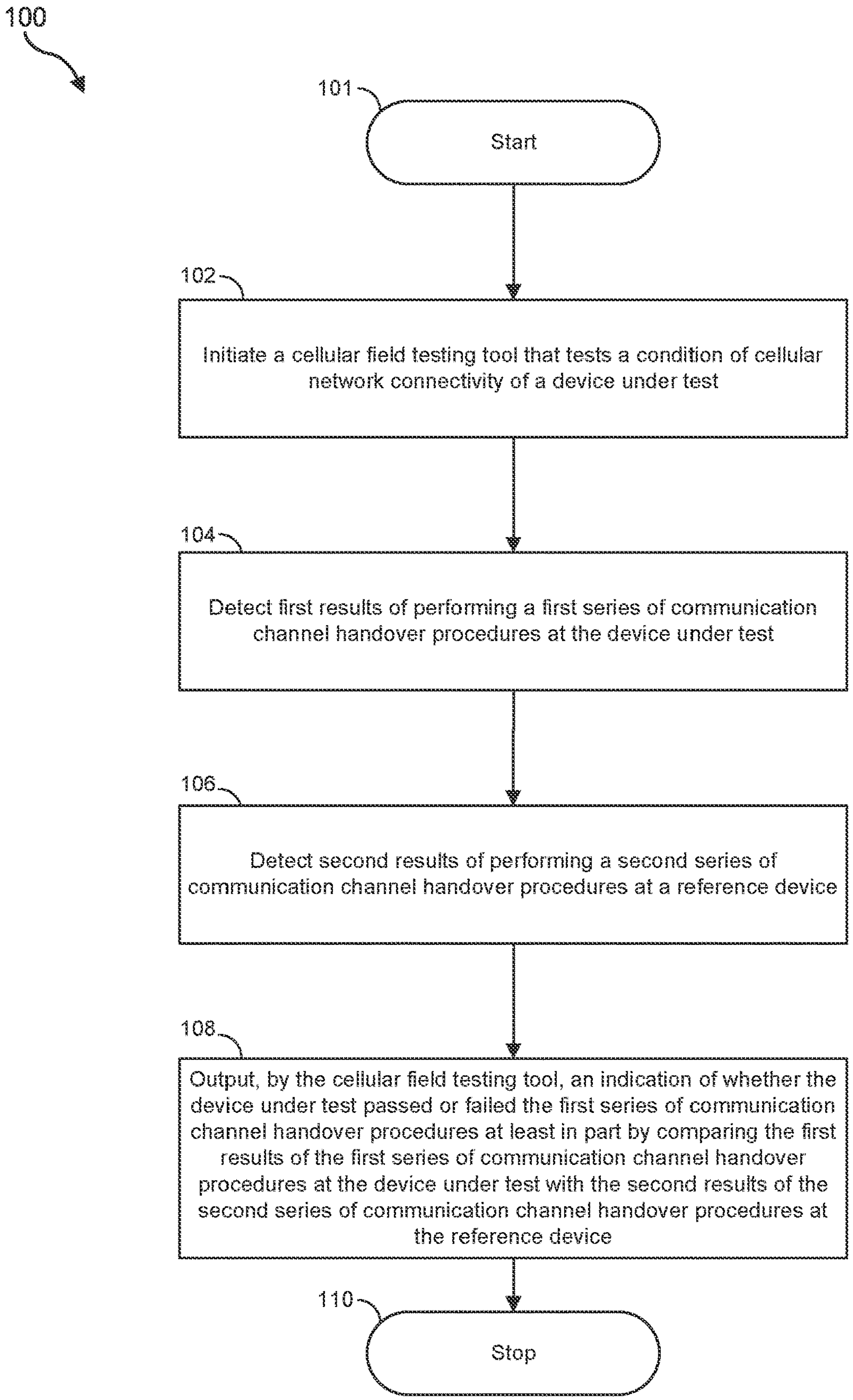
FIG. 1 shows a flow diagram for a method for a cellular field testing automation tool and automated communication channel handover procedures.

FIG. 1 shows a flow diagram for an example method for testing communication channel handover procedures. As step 101, method 100 may start. At step 102, a cellular field testing tool may be initiated that tests a condition of cellular network connectivity of a device under test. At step 104, the cellular field testing tool may detect first results of performing a first series of communication channel handover procedures at the device under test. At step 106, the cellular field testing tool may detect second results of performing a second series of communication channel handover procedures at a reference device. At step 108 the cellular field testing tool may output an indication of whether the device under test passed or failed the first series of communication channel handover procedures at least in part by comparing the first results of the first series of communication channel handover procedures at the device under test with the second results of the second series of communication channel handover procedures at the reference device. At step 110, method 100 may stop or conclude.

As used herein, the term "cellular field testing tool" generally refers to a tool that helps to test, when a device under test is connected to a cellular base station and/or a cellular network, one or more attributes of performance and/or cellular network connectivity provided to the device under test. In other words, the cellular field testing tool generally tests how well the device under test performs (or how well the network performs) when connected, and configured, in accordance with a particular configuration at a particular location. Cellular network carriers may be requested to, or required to, satisfy one or more specifications when smartphones and/or other items of user equipment are connected to cellular networks. To help ensure that the cellular network carriers satisfy these particular specifications, the cellular field testing tool can be used to connect to a device under test and then check or verify that the device under test is actually achieving cellular network connectivity that satisfies one or more corresponding performance metrics, which may include dozens or even hundreds of such performance metrics. In some examples, a cellular field testing tool may correspond to (or include) a radio frequency drive testing tool, as that term is used by those having skill in the art. In some examples, a cellular field testing tool may include a drive testing tool or a radio frequency drive testing tool, as those tools are used by those having skill in the art.

Despite the above, some cellular field testing tools can suffer from one or more deficiencies or sub-optimizations and these tools may, therefore, benefit from one or more improvements, including improvements that automate one or more procedures that assist a user with operating the tool. These improved cellular field testing tools can, therefore, enable employees, contractors, and/or administrators of the cellular network carriers to appropriately operate these tools even if the administrators lack a degree of experience, sophistication, and/or detailed education regarding the performance and operation of the tools. In other words, automated improvements for the cellular field testing tools can enable less sophisticated operators to operate the tools in a more streamlined and/or user-friendly manner. Consequently, these improvements can furthermore reduce a burden on the carriers of training and/or educating these operators, while further increasing a potential pool of candidate operators for carrying out these testing procedures, as discussed in more detail below.

Similarly, as used herein, the term "precondition" can generally refer to one or more conditions that must be satisfied prior to the starting of a specific and corresponding cellular field testing tool test. Generally speaking, these preconditions refer to contextual preconditions that help to establish that the cellular field testing tool, when operating, will perform successfully and obtain results that are valid and useful (see the discussion of FIG. 3 below). Accordingly, the term "precondition," as used herein, generally does not refer to universal software preconditions that would generally apply even outside of the context of cellular field testing tools. For example, the term "precondition," as used herein, will generally not refer to a requirement to powering on the computing device executing the cellular field testing tool, in view of the fact that such a precondition would generally apply to all software even outside of the context of cellular field testing tools.

As used herein, the term "set" can generally refer to a collection of at least one precondition, unless indicated otherwise. Generally speaking, such cellular testing tools may benefit from checking or verifying a larger multitude of preconditions, as discussed in more detail below.

Figure 2:
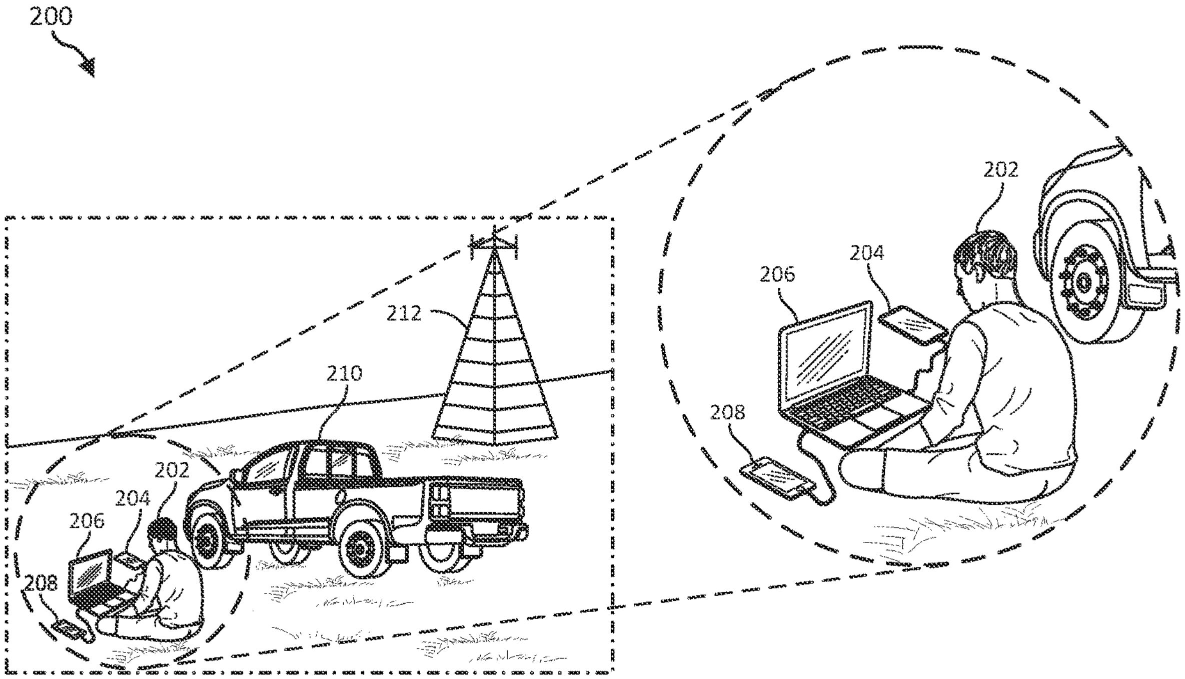
FIG. 2 shows a user operating a cellular field testing automation tool.

FIG. 2 shows an illustrative diagram 200 that helps to establish a context in which the methods described herein may be performed. As further shown in this diagram, a user or operator 202 may execute a cellular field testing tool on an item of user equipment or a computing device, such as a laptop 206. At the same time, the user may connect to additional computing devices and/or items of user equipment, such as a smartphone 204 and/or smartphone 208. In some examples, smartphone 204 may correspond to a device under test, where a smartphone 208 may correspond to a reference device (e.g., a device that may have been previously tested and/or verified as operating within specifications), or vice versa. For completeness, diagram 200 also illustrates how user 202 may have driven a truck 210 to a remote area at a particular location, where the user may establish cellular network connectivity with a cellular base station 212.

Figure 3:
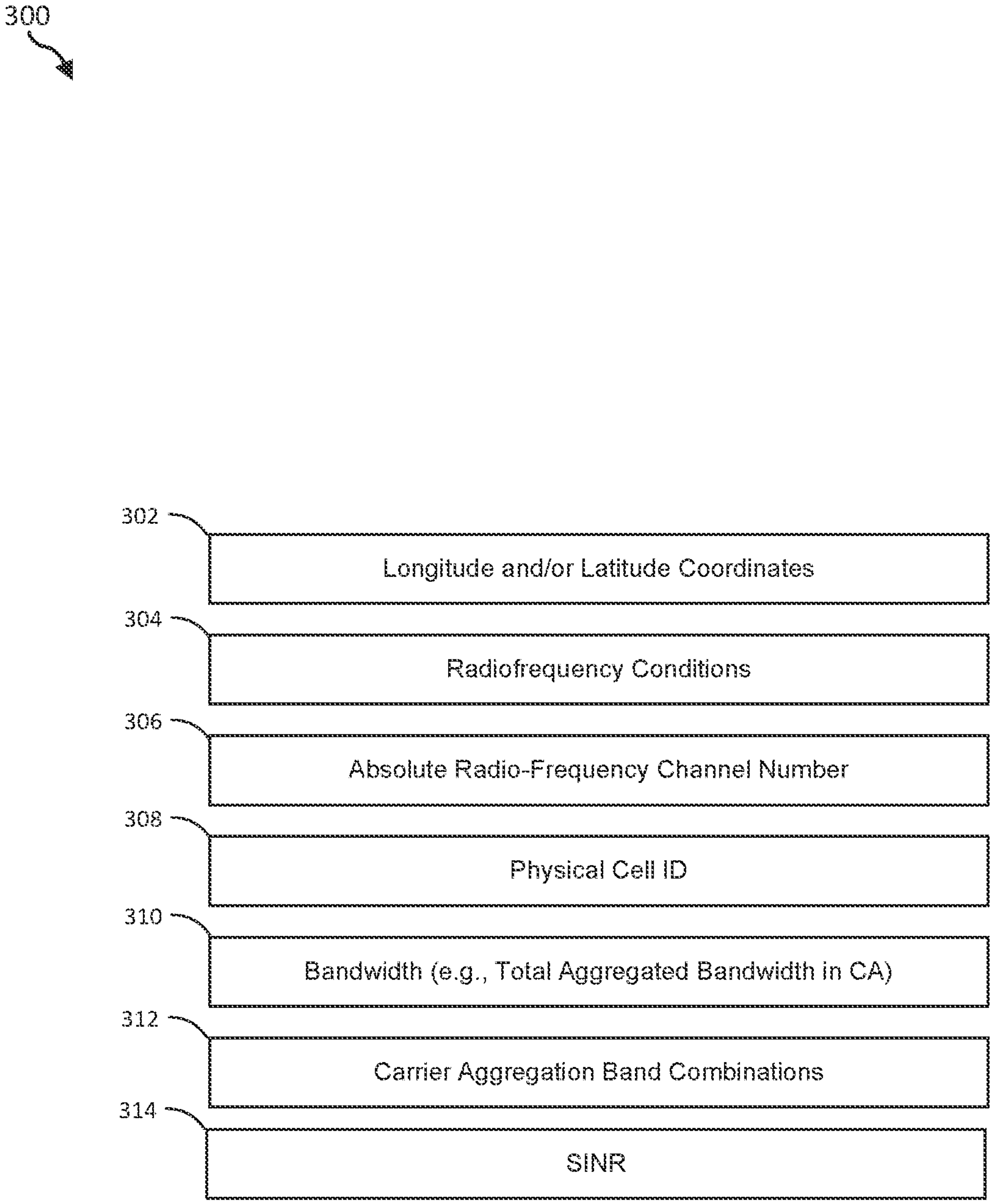
FIG. 3 shows example preconditions that can be checked prior to enabling a user to operate the cellular field testing automation tool.

FIG. 3 shows a helpful list 300 of illustrative examples of preconditions that can be checked. Precondition 302 includes longitude and/or latitude coordinates. For example, this may involve verifying that the device under test and/or the reference device (which can generally be co-located as shown in FIG. 2) are sufficiently close to, or located within, particular geolocation coordinates or perimeters. Precondition 304 includes radiofrequency conditions. Illustrative examples of such aerial frequency conditions may include one or more of the following values or measurements: Reference Signal Received Power (RSRP), Reference Signal Received Quality (RSRQ), and/or Signal to Interference plus Noise Ratio (SINR). Other illustrative examples of radio frequency conditions, which may be more or less applicable or relevant, in various embodiments, than those listed above, may further include Received Signal Strength Indicator (RSSI), Signal to Noise plus Interference Ratio (SNIR), Signal to Noise Ratio (SNR), Arbitrary Strength Unit (ASU), and/or Signal to Noise Ratio (RS SINR or RSSNR).

Returning to FIG. 3, precondition 306 may include an Absolute Radio-Frequency Channel Number (ARFCN). This particular value may refer to a unique number given to each radio channel in a Global System for Mobile Communications (GSM) cellular network. Precondition 308 may refer to a physical cell ID. As illustrated in FIG. 2, the device under test and/or the reference device may be connected to a computing device, such as a laptop, that executes the cellular field testing tool. These connections may be wired or wireless, and wired connections may be formatted to conform with the PCI protocol, USB protocol, BlueTooth, etc. Helping to ensure proper connections to the computing device that is executing the cellular field testing tool helps to ensure that, when the tool executes a specific test, the corresponding connection with the device under test and/or reference device is appropriately established to successfully interface with the logging tool to collect upload and download packets sent and received from the device under test and/or the reference device. Precondition 310 may refer to the total, aggregated bandwidth of both the device under test and the reference device, if carrier aggregation (CA) is applicable, to ensure that the device under test and the reference device are conducted under the same network conditions. Lastly, precondition 312 can refer to carrier aggregation cell combinations. As understood by those having skill in the art, some cellular network carriers can aggregate portions of spectrum and/or their cellular networks (e.g., for roaming purposes, etc.). Precondition 312 may help to check and verify that both the device under test and the reference device have the same band configurations aggregated prior to the beginning of performing one or more specific tests by the cellular field testing tool. Precondition 314 can refer to Signal to Interference and Noise Ratio (SINR).

Figure 4:
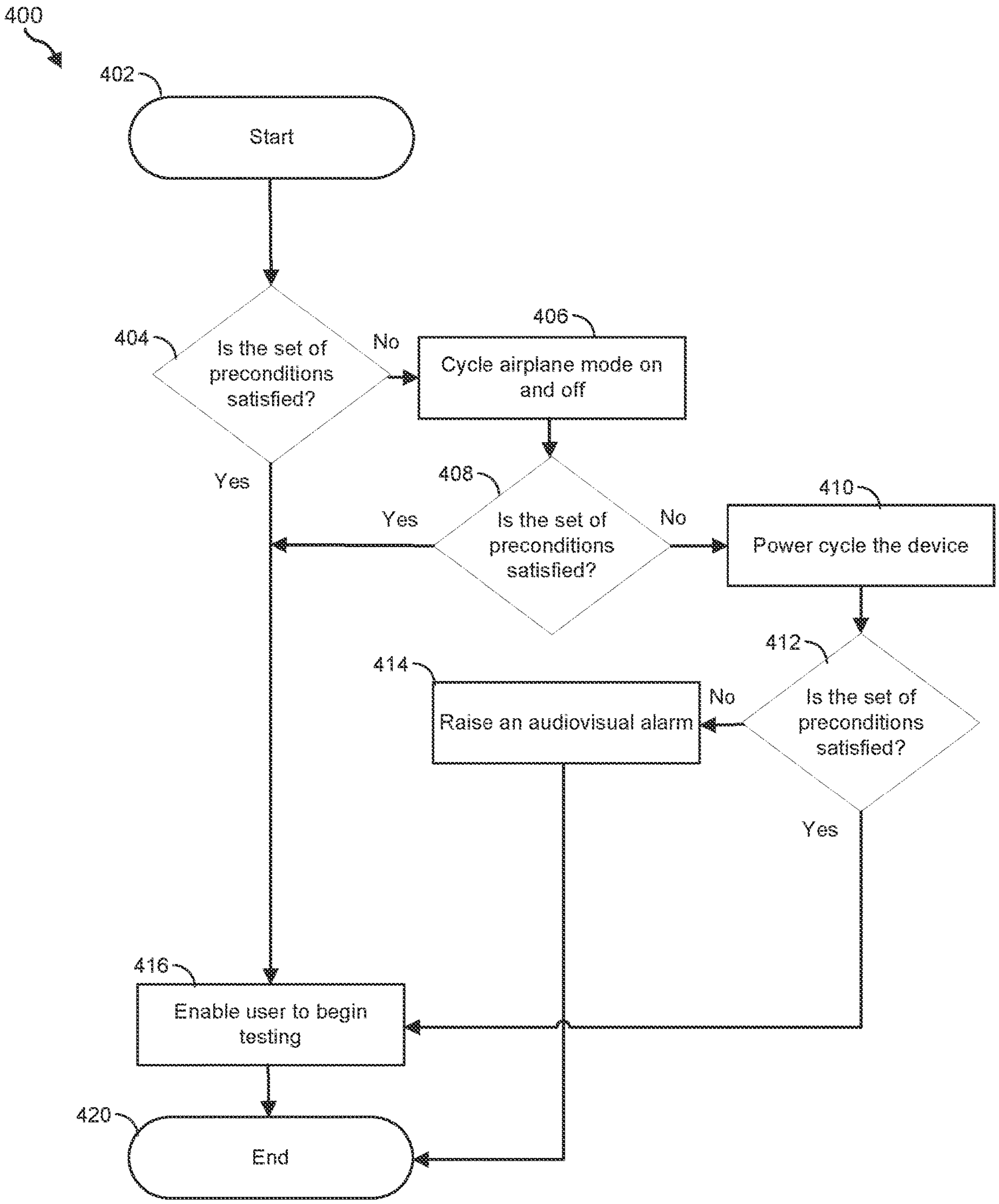
FIG. 4 shows another flow diagram for a method performed by a cellular field testing automation tool.

FIG. 4 shows a flow diagram for an example method 400 relating to operation of the cellular field testing tool. Method 400 helps to illustrate how, when checking for whether preconditions are satisfied, embodiments described herein may perform a series of different remedial actions in response to detecting that the preconditions are actually not satisfied. In some examples, the series of remedial actions may be increasingly staggered in terms of seriousness or severity, as discussed further below. The example of method 400 includes a series of three separate and staggered remedial actions (see step 406, step 410, and step 414). Although this example focuses on a set of three remedial actions, any suitable number or arbitrary number of remedial actions may be performed, in a parallel manner, as understood by those having skill in the art, with the goal of eventually achieving the successful satisfaction of all the preconditions. Moreover, although this example focuses on checking the exact same set of preconditions at each stage of the staggered process, in other examples the exact number or identity of the members of the set of preconditions may vary, slightly or more than slightly, between the different stages of the staggered process.

At step 402, method 400 may begin. At decision step 404, method 400 may perform a first check of whether the set of preconditions is satisfied. If the answer is yes at decision step 404, then method 400 may proceed to step 416, at which point method 400 may enable the user to begin a specific test, as discussed in more detail below. Alternatively, if the answer is no at decision step 404, then method 400 may proceed to step 406, at which point method 400 may cycle airplane mode on and off the specific device that is failing the preconditions (e.g., the device under test and/or the reference device).

From step 406, method 400 may proceed to decision step 408, which may correspond to the second stage of a staggered series of stages of testing whether the overall set of preconditions has been satisfied. In particular, at decision step 408, method 400 may check for the second time whether the set of preconditions has been satisfied. If the answer is no at decision step 408, then method 400 may proceed to step 410, at which point method 400 may power cycle the device that is failing the preconditions. Alternatively, again, if the answer is yes at decision step 408, then method 400 may proceed to step 416, at which point method 400 may enable the user to begin a specific test.

Lastly, as a third stage of method 400, at decision step 412, method 400 may again check whether the set of preconditions has been satisfied. If the answer is yes at decision step 412, then method 400 may proceed to step 416 again, at which point method 400 may enable the user to begin a specific test. Alternatively, if the answer is no at decision step 412, then method 400 may proceed to step 414, at which point method 400 may raise an audio and/or visual alarm to the user (see also the discussion of FIG. 14 below). At step 420, method 400 may conclude.

Figure 5:
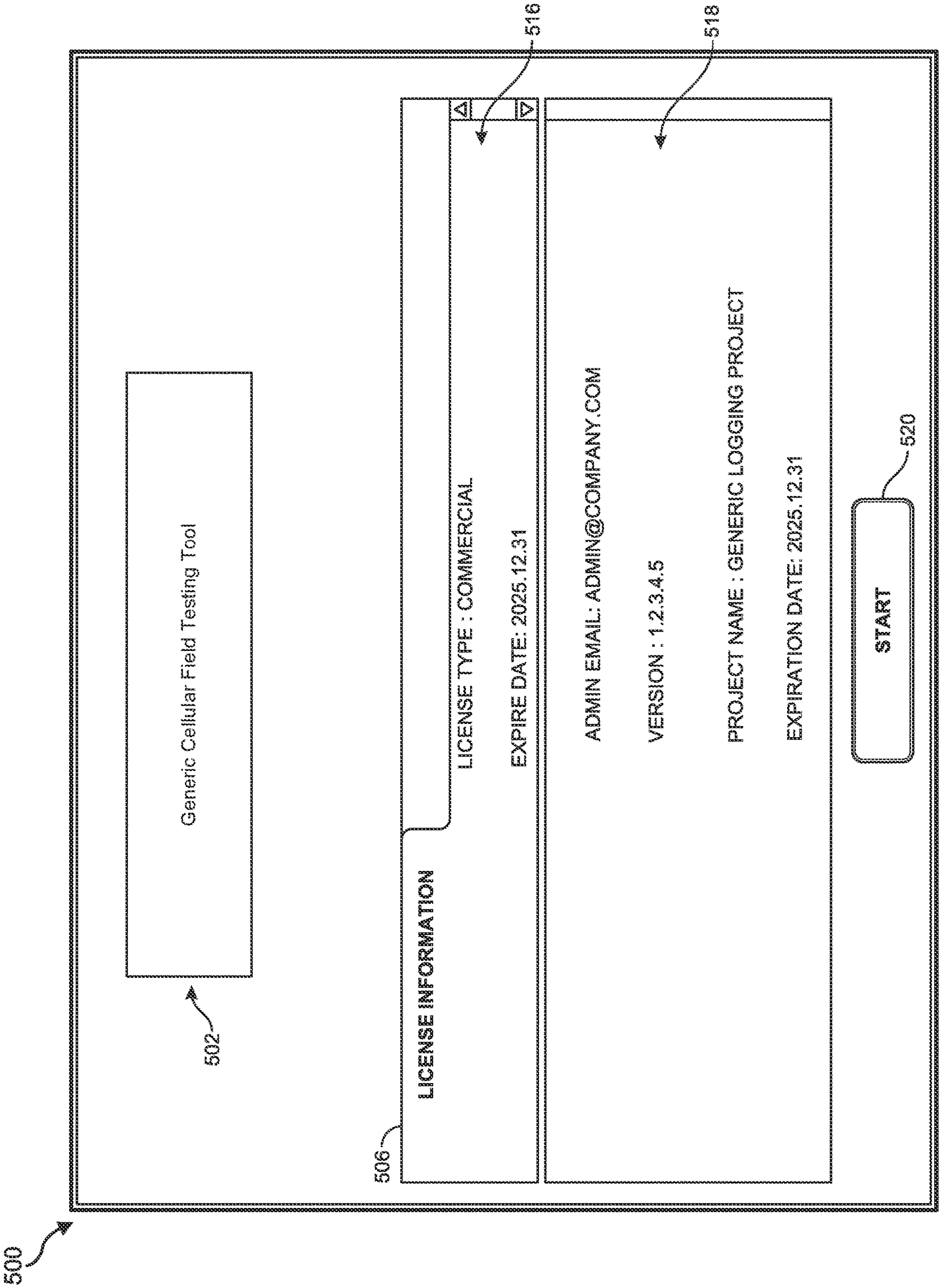
FIG. 5 shows an example introductory screen of a graphical user interface of the cellular field testing automation tool.

FIG. 5 shows a diagram 500 for an introductory screen of a graphical user interface for a cellular field testing tool that can be operated in accordance with method 400. As further shown in diagram 500, this introductory screen may include a headline 502 that indicates the name of the particular cellular field testing tool and/or software development company providing such a tool. In the simplified example of this figure, headline 502 indicates a generic name of "Generic Cellular Field Testing Tool." A graphical user interface element 506 may indicate license information. A window 516 may further provide information about the corresponding license, including its type and/or expiration date. Below that, a window 518 may further provide information about contacting a corresponding cellular network carrier ("company") that may be licensing and/or operating the corresponding software, as well as indications of a version of the software, a project name, and/or an expiration date of the license.

Figure 6:
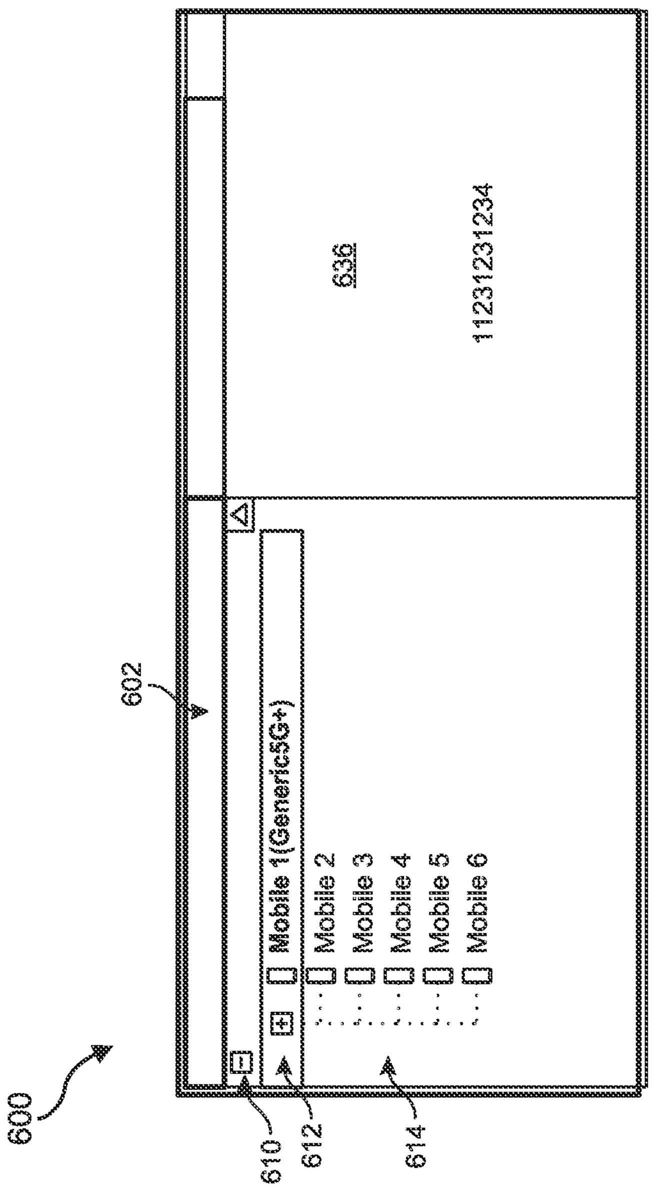
FIG. 6 shows an example screen of the graphical user interface of the cellular field testing automation tool.

FIG. 6 shows a diagram 600 of a screen of the same graphical user interface that may be presented as a result of selecting a button 520 (see FIG. 5) for starting execution of the corresponding cellular field testing tool. As further shown in diagram 600, the graphical user interface may include a devices list 602, and a drop-down menu 610 may indicate a list of mobile devices for testing. A graphical user interface element 612 may indicate the selection or connection of a specific mobile device ("Generic5G+" in this example). Moreover, a graphical user interface element 614 may further indicate a list of other candidate devices that may be selected or configured for testing. As further shown in this diagram, a portion 636 of diagram 600 indicates that the tool has connected to a particular phone number of the same mobile device corresponding to graphical user interface element 612.

Figure 7:
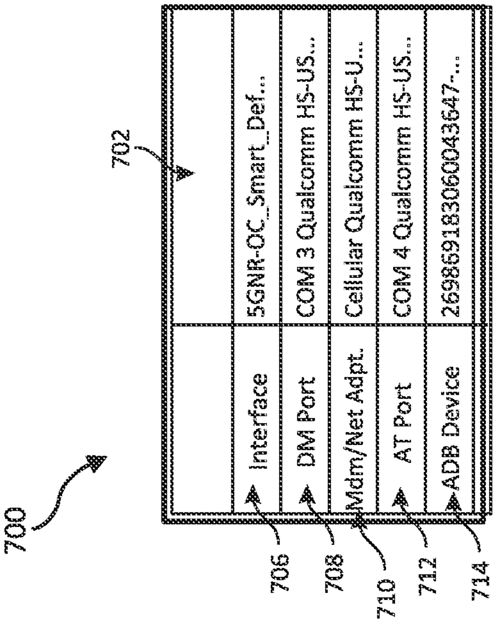
FIG. 7 shows an example screen of the graphical user interface of the cellular field testing automation tool.

FIG. 7 shows a diagram 700 of another screen of the same graphical user interface after the mobile device has been connected to initiate one or more specific tests. At this stage of operating the cellular field testing tool, the user or operator may toggle or configure one or more fields with values to set up specific testing procedures for each mobile device. Diagram 700 shows a portion 702 which corresponds to a connected mobile device of FIG. 6. A set of graphical user interface elements 706-714 show respective attributes or fields that the operator can toggle or configure to set up further testing procedures. In particular, as shown in this figure, the operator can configure, for each connected mobile device, an interface, a DM port (diagnostics and monitoring port), an MDM (Mobile Device Management) net adapter value, an AT port, and/or an Android Debug Bridge device value. In various examples, one or more of these values may be required to be configured to proceed with specific testing procedures. These examples of parameters that can be configured prior to beginning specific testing procedures are merely illustrative and, in other examples, additional or alternative parameters may be configured as appropriate.

Figure 8:
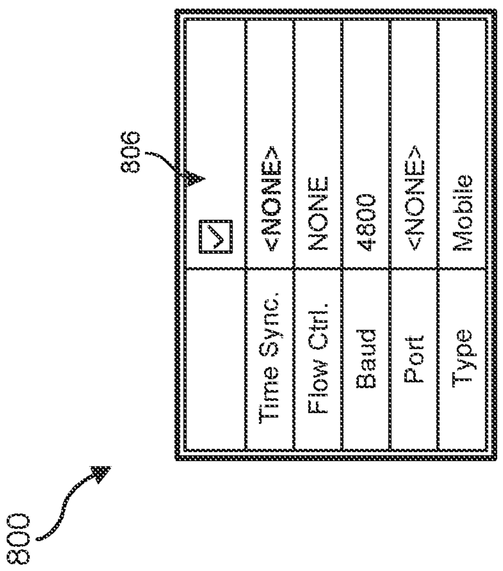
FIG. 8 shows an example screen of the graphical user interface of the cellular field testing automation tool.

FIG. 8 shows a diagram 800 that elaborates on a different aspect of the graphical user interface that was further shown as diagram 700. In particular, the corresponding diagram further illustrates how, prior to beginning specific testing procedures, the operator of the cellular field testing tool may toggle a Global Positioning System (GPS) field 806 to enable GPS functionality on one or more specific mobile devices that are under test.

Figure 9:
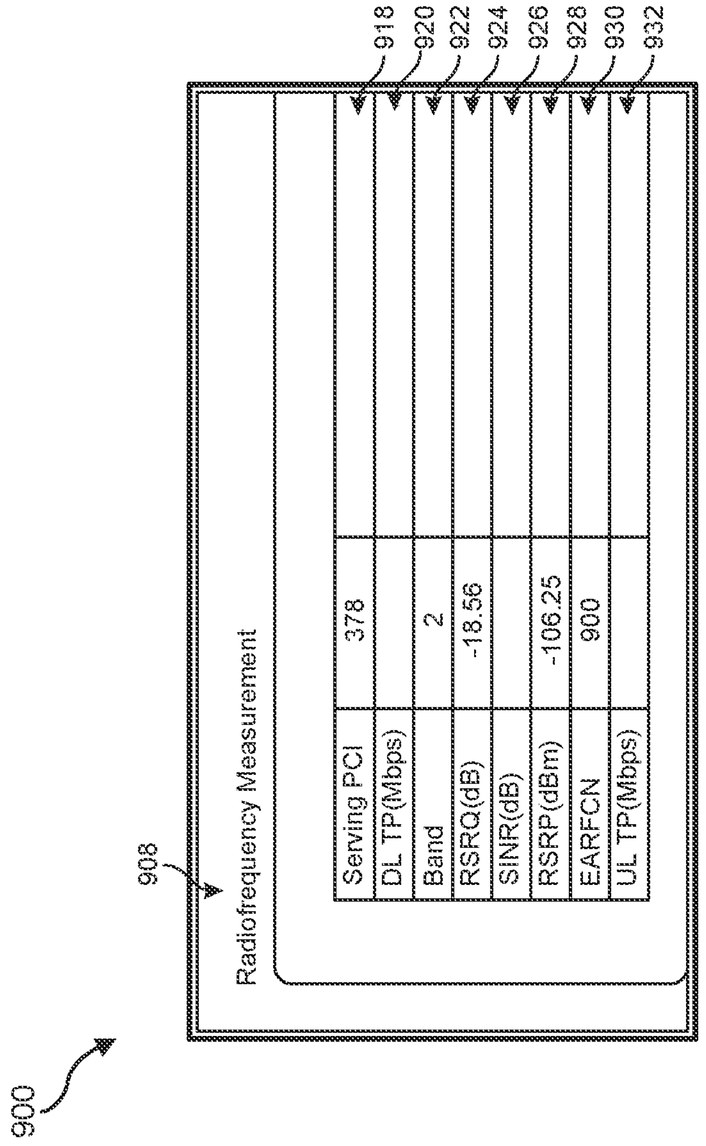
FIG. 9 shows an example screen of the graphical user interface of the cellular field testing automation tool.

FIG. 9 shows a diagram 900 of another screen of the graphical user interface of the cellular field testing tool. As further shown in this diagram, the graphical user interface can indicate to the operator one or more radiofrequency measurements and corresponding network connection attributes. A headline 908 may indicate "Radiofrequency Measurement." Rows 918-932 of diagram 900 may list respective measurement values relating to radiofrequency connectivity.

Figure 10:
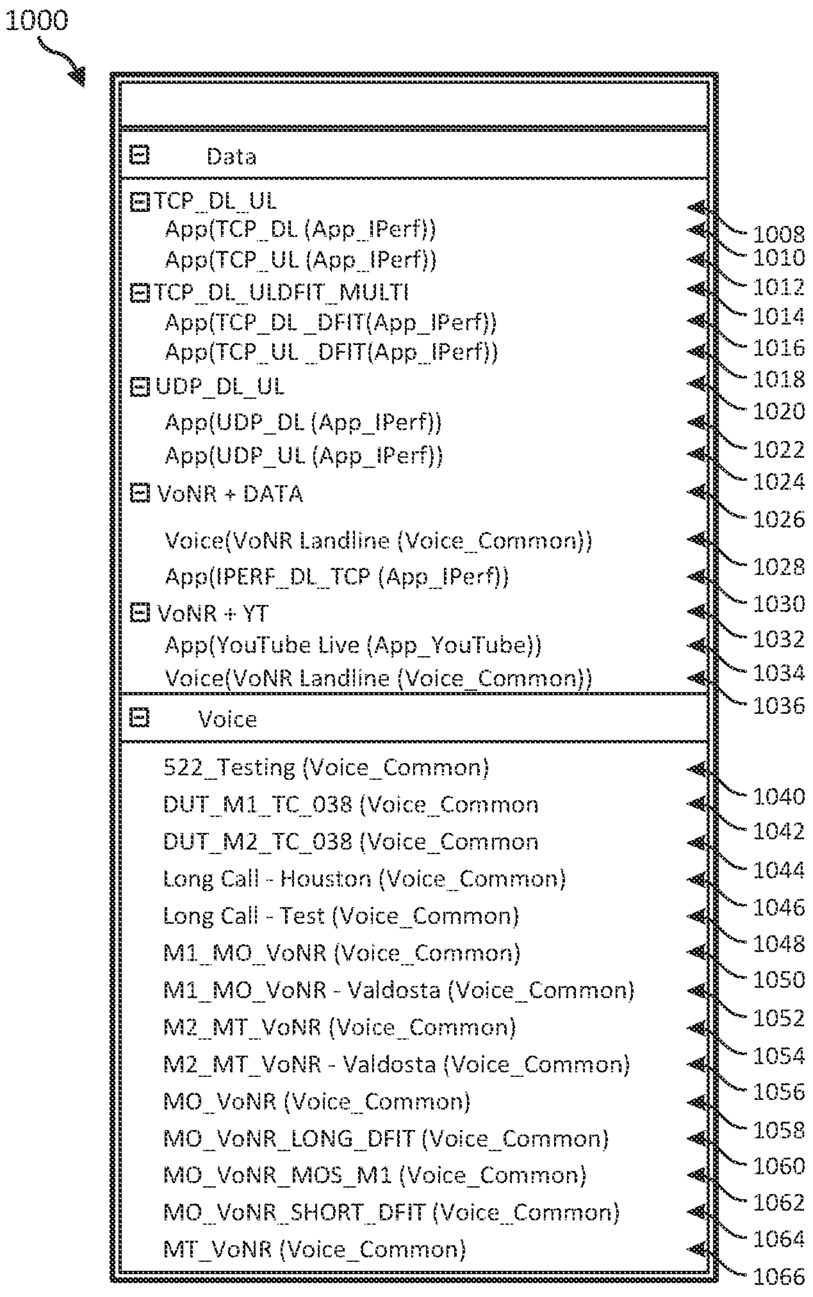
FIG. 10 shows an example screen of the graphical user interface of the cellular field testing automation tool.

FIG. 10 shows a diagram 1000 of another screen of the graphical user interface of the cellular field testing tool. As further shown in this figure, rows 1008-1066 may specify the names of different respective tests that the cellular field testing tool can perform, which can be user-customized, and these various specific tests may be categorized as either various different tests for testing data connections (see rows 1008-1036) and/or various different tests for testing voice connections (see rows 1040-1066).

Figure 11:
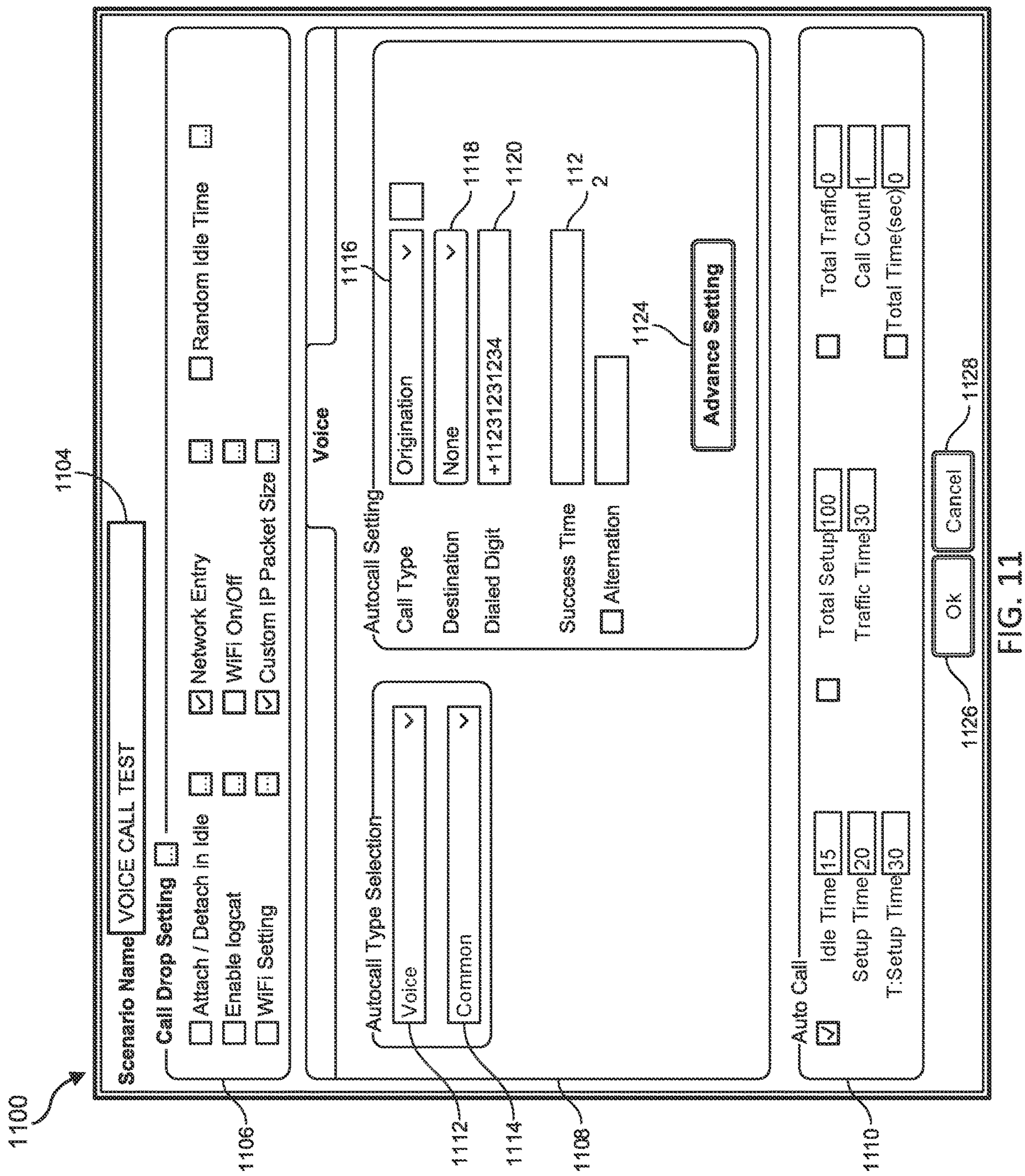
FIG. 11 shows an example screen of the graphical user interface of the cellular field testing automation tool.

FIG. 11 shows a diagram 1100 of another screen of the graphical user interface of the cellular field testing tool. As shown in this figure, diagram 1100 may include a scenario name 1104, as well as a panel 1106 of various fields or options that the operator can configure when setting up this particular test ("VOICE CALL TEST"). Another panel 1108 may further include a similar but distinct set of various fields or options that the operator can configure appropriately. Lastly, another panel 1114 may enable the user to further specify various values for another set of corresponding parameters as part of the configuration before initiating or executing the specific testing procedure. A button 1128 may enable the operator to cancel the current set of configuration procedures, and a button 1126 may enable the user to finalize configuration settings and proceed to the next stage of specific testing procedures.

Figure 12:
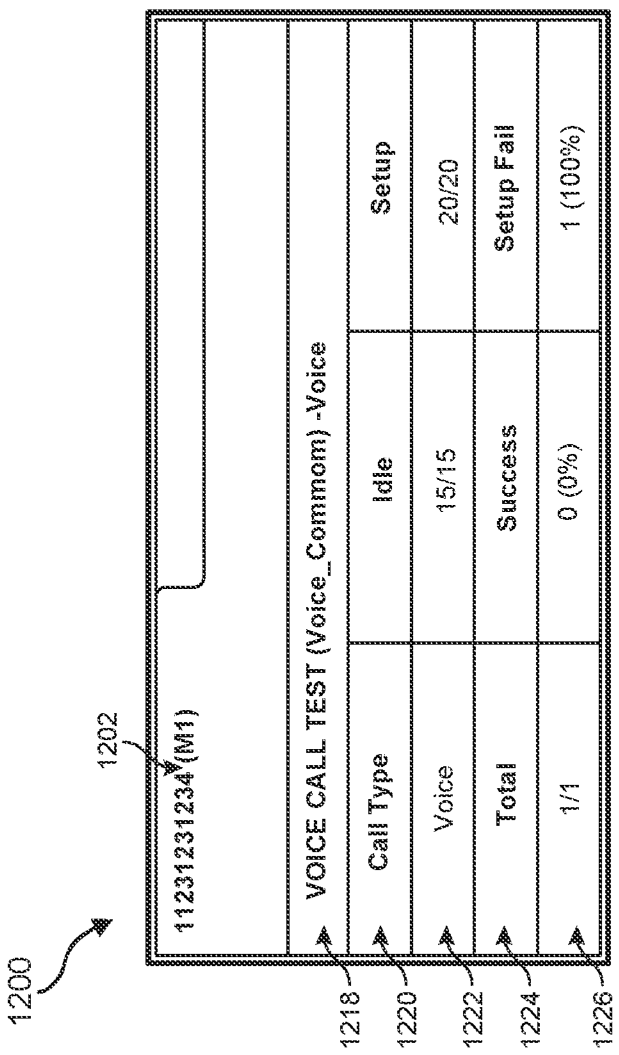
FIG. 12 shows an example screen of the graphical user interface of the cellular field testing automation tool.

FIG. 12 shows a diagram 1200 of another screen of the graphical user interface of the cellular field testing tool. An indicator 1202 may identify the phone number for the corresponding device under test. Generally speaking, the data displayed within the lower body of the window of diagram 1200 may display results, in real time, as one or more specific tests of the cellular field testing tool are being executed. In particular, a row 1220 and another respective row 1224 may display identifiers, within respective columns, to identify the type of resulting output information displayed in the rows that are immediately beneath these identifying rows. Thus, as further shown within diagram 1200, row 1222 may display values corresponding to the identifiers shown within row 1220, and row 1226 may display values corresponding to the identifier shown within row 1224. By way of illustrative example, row 1222 indicates that the call type (as indicated by row 1220) is "voice" within the same respective column.

Figure 13:
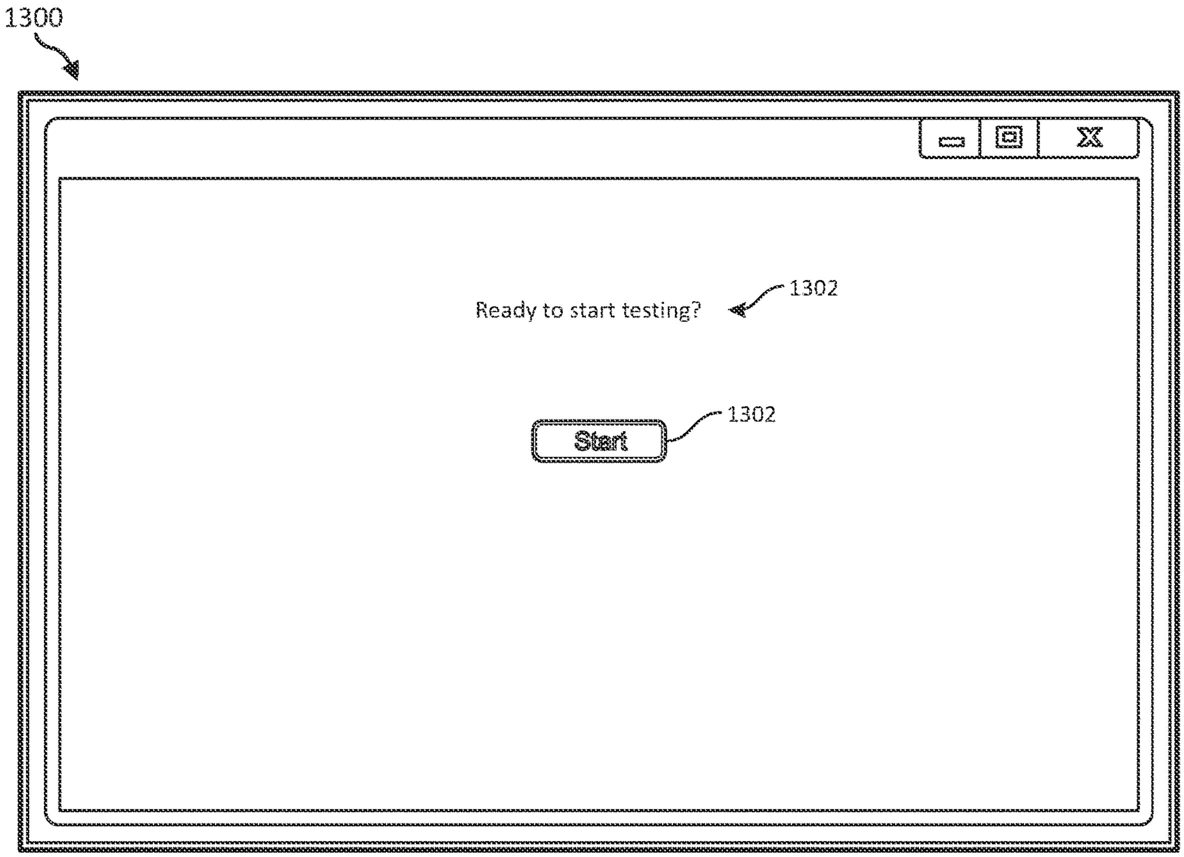
FIG. 13 shows an example screen of the graphical user interface of the cellular field testing automation tool.

FIG. 13 shows a diagram 1300 of a graphical user interface of the same cellular field testing tool that enables, or disables, the option for the operator to begin a specific test, including the specific tests that are identified or listed above by way of illustrative example. A prompt 1302 may inquire of the user whether the user is ready to begin testing procedures, after any one or more of the configuration and setup procedures that are outlined above have been performed, consistent with the discussion of FIGS. 5-12, for example. Graphical user interface element 1302, when this element is enabled, may allow the user to toggle the element and thereby finally begin specific testing procedures in accordance with the previous configuration and setup.

Nevertheless, as previously discussed above in connection with method 400, graphical user interface element 1302 and/or any suitable substitute for inputting information within the computing arts, may be disabled if the set of preconditions has not been satisfied. Thus, in various examples, graphical user interface element 1302 may be displayed in a "grayed out" manner such that, although the user can read a dimmer or grayer version of the "Start" text, attempting to toggle or select graphical user interface element 1302 may not result in any corresponding functionality. In other words, when not enabled, graphical user interface element 1302 may simply correspond to essentially frozen pixels that remain the same regardless of whether the user attempts to toggle them or not. Those having skill in the art will readily understand that any other suitable mechanism for disabling an input mechanism or graphical user interface button may be used to achieve essentially the same purpose of preventing the user from beginning a specific test procedure prior to the preconditions all being satisfied. Moreover, as soon as the preconditions are satisfied, perhaps after one or more stages of performing a series of remedial actions (see FIG. 4), graphical user interface element 1302 may be enabled such that the user can successfully toggle it to trigger the initiation of specific testing procedures.

As further discussed above, in some scenarios, even after performing a series of remedial actions (see the three remedial actions of FIG. 4), the set of preconditions may nevertheless remain unsatisfied. In that scenario, the computing device executing the cellular field testing tool may issue an alert to the user. In some related methodologies, there may be no such alert and/or the alert may be inconspicuous. Accordingly, this disclosure envisions alerts that are both conspicuous and audiovisual in nature such that the user receives both an audio alert as well as a visual alert, thereby clearly bringing this information to the attention of the user.

Figure 14:
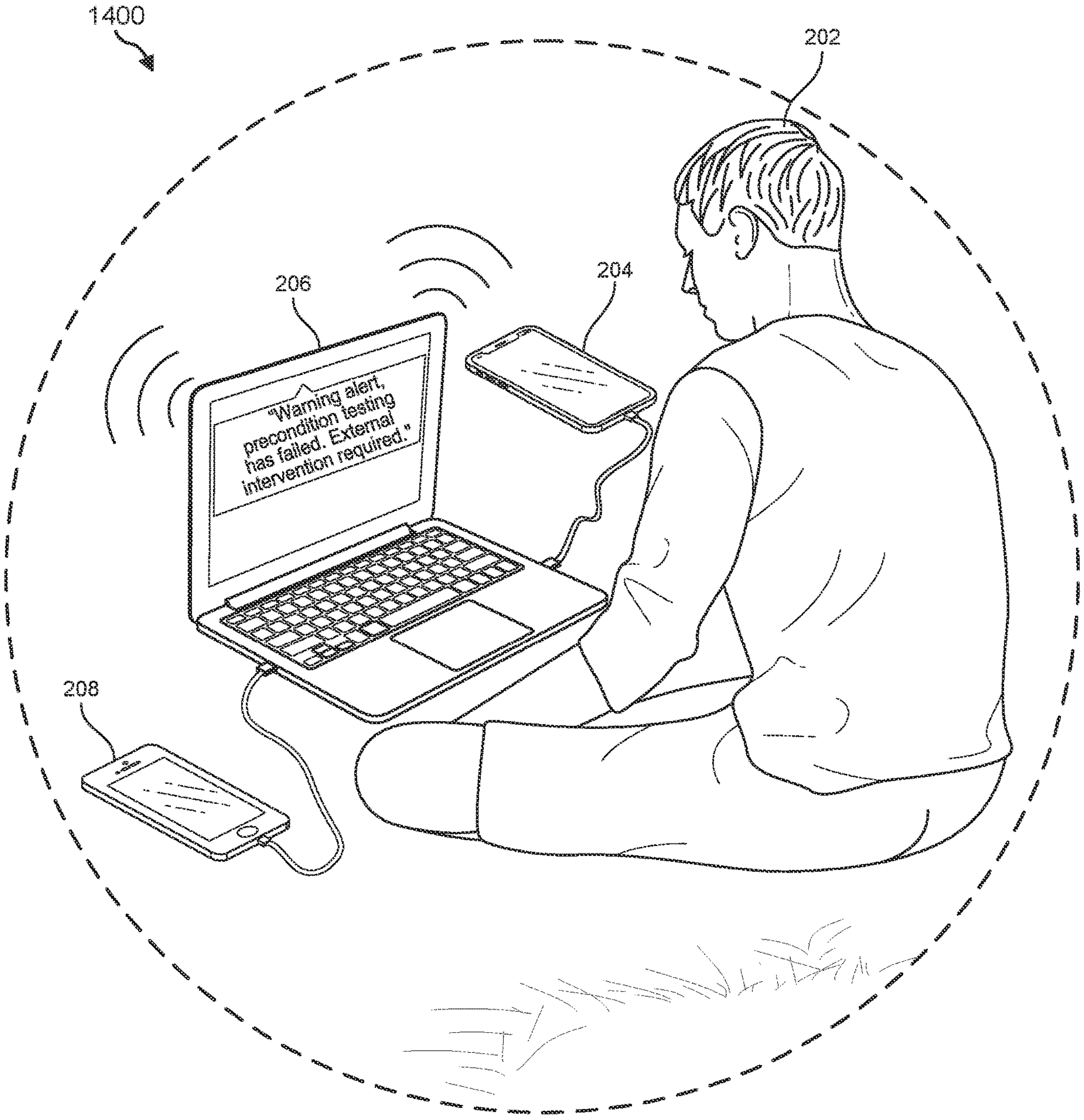
FIG. 14 shows a magnified view of the user operating the cellular field testing automation tool.

FIG. 14 shows a diagram 1400 of a magnified view of user 202 operating laptop 206 in connection with smartphone 204 and smartphone 208. As shown in this diagram, the visual alert may indicate to the user "Warning alert, precondition testing has failed. External intervention required." Those having skill in the art will readily ascertain that the particular text of this specific alert is merely an example for illustrative purposes and, in other examples, different variations and/or substitutes of such warnings may be used appropriately to notify the user.

The above discussion of FIGS. 2-14 provides background contextual information regarding radiofrequency drive testing for the following discussion of method 100 and related FIGS. 15-23. As further discussed above, method 100 may include (i) initiating a cellular field testing tool that tests a condition of cellular network connectivity of a device under test, (ii) detecting first results of performing a first series of communication channel handover procedures at the device under test, (iii) detecting second results of performing a second series of communication channel handover procedures at a reference device, and (iv) outputting, by the cellular field testing tool, an indication of whether the device under test passed or failed the first series of communication channel handover procedures at least in part by comparing the first results of the first series of communication channel handover procedures at the device under test with the second results of the second series of communication channel handover procedures at the reference device. As used herein, the "first series of communication channel handover procedures" and the "second series of telecommunication channel handover procedures" may refer to the same instance of executing the same communication channel handover procedures (e.g., the usage of "first" and "second" does not necessarily imply, or acquire, for these two to be distinct), or they may be different, as discussed further below.

As used herein, the term "communication channel handover procedures" generally refers to procedures or methodologies for switching, alternating, or performing handover between communication channels or modes or technologies with a mobile device such as a smartphone or tablet. Illustrative examples of such communication channels may include new radio (i.e., 5G NR), 4G radio, 3G radio, LTE radio, Wi-Fi, Bluetooth, or near-field communication channels. In one illustrative embodiment, voice calls or telephone calls may be performed over one or more of the channels. Moreover, during one or more of these voice calls, the mobile device may attempt to switch from one of the communication channels, such as new radio, to another one of the telecommunication channels, such as Wi-Fi. This switching procedure may be performed in response to the user toggling or enabling the new telecommunication channel, such as Wi-Fi, as discussed further below in connection with FIG. 20.

In view of the above, one or more entities or organizations, such as a cellular service carrier, may wish to ascertain how well the mobile device performs when performing communication channel handover procedures. These entities or organizations may desire for the mobile device to perform in a manner that satisfies one or more key performance indicators that are associated with, and/or that correspond to, metrics measuring how well the mobile device performs such communication channel handover procedures. Optionally, in some illustrative examples the key performance indicators may be specified by another entity, such as a government (e.g., in order to receive permission for cellular or business operation or to otherwise comply with one or more government regulations). In other examples, the entities or organizations may simply desire to achieve sufficiently high levels of customer satisfaction with mobile device performance.

In some examples of related methodologies, various performance metrics for how well a mobile device performs as part of a corresponding network may be measured according to cellular field testing or radiofrequency drive testing. Nevertheless, in some of these instances of cellular field testing or radio frequency drive testing, no analysis may be performed with respect to handover procedures between new radio and Wi-Fi communication channels, for example. These related methodologies may include a cellular field testing or radiofrequency drive testing tool that captures Real-Time Transfer Protocol packets and/or IP Multimedia Core Network Subsystem signaling messages as part of the handover from the radio to Wi-Fi. Nevertheless, in these examples, any additional analysis may be performed by, or may involve, a skilled engineer manually and tediously reviewing logs after such handover procedures are performed. Accordingly, this application discloses new methods, systems, and/or computer-readable media that may address the associated inefficiencies and/or drawbacks of the related manual and tedious methodologies, as discussed in more detail below.

The handover or switch between two communication channels, such as Wi-Fi and new radio, may be detected through decoding Real-Time Transfer Protocol packets and/or IP Multimedia Core Network Subsystem signaling messages, which may indicate that such a handover procedure has begun or succeeded. In other words, method 100 may further involve decoding a packet header to identify a type of radio access technology such that the decoding acts as a start criterion for beginning a first series of communication channel handover procedures.

Figure 15:
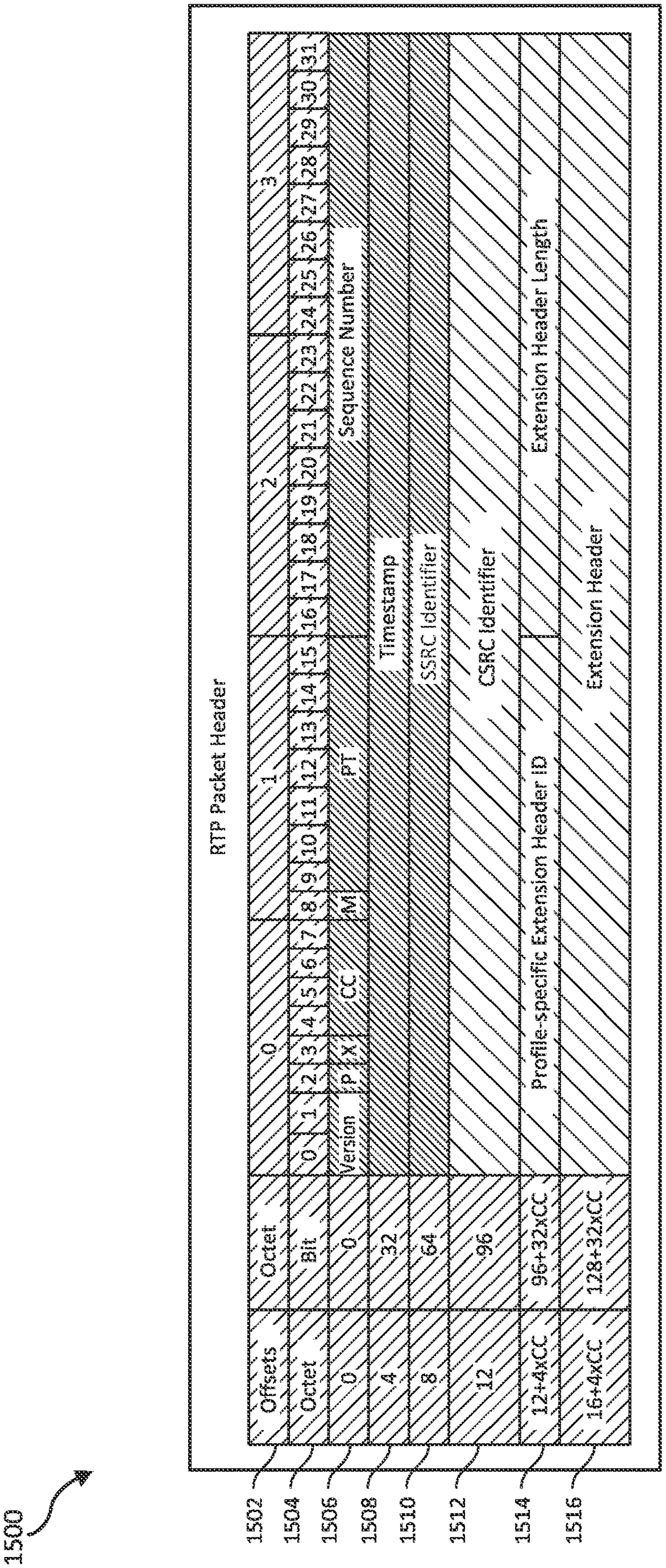
FIG. 15 shows a diagram of a Real-time Transport Protocol packet.

FIG. 15 shows an illustrative diagram 1500 of an example Real-Time Transfer Protocol packet header. Diagram 1500 may include rows 1502-1516, which may specify respective fields of information, as shown. This particular network protocol may be used for the transmission of voice or video media and, therefore, may be used for the carrying out of telephone calls. Among other items of information, row 1506 may specify a version number, a payload type, and a sequence number; row 1508 may specify a timestamp; row 1510 may specify a synchronization source identifier; row 1512 may specify a contributing source identifier, and rows 1514-1516 may specify an extension. As one illustrative example, decoding a network packet header corresponding to diagram 1500 may indicate that a new multimedia stream has been created and transmitted across a particular communication channel (e.g., after switching from a first telecommunication channel), as further discussed above.

Figure 16:
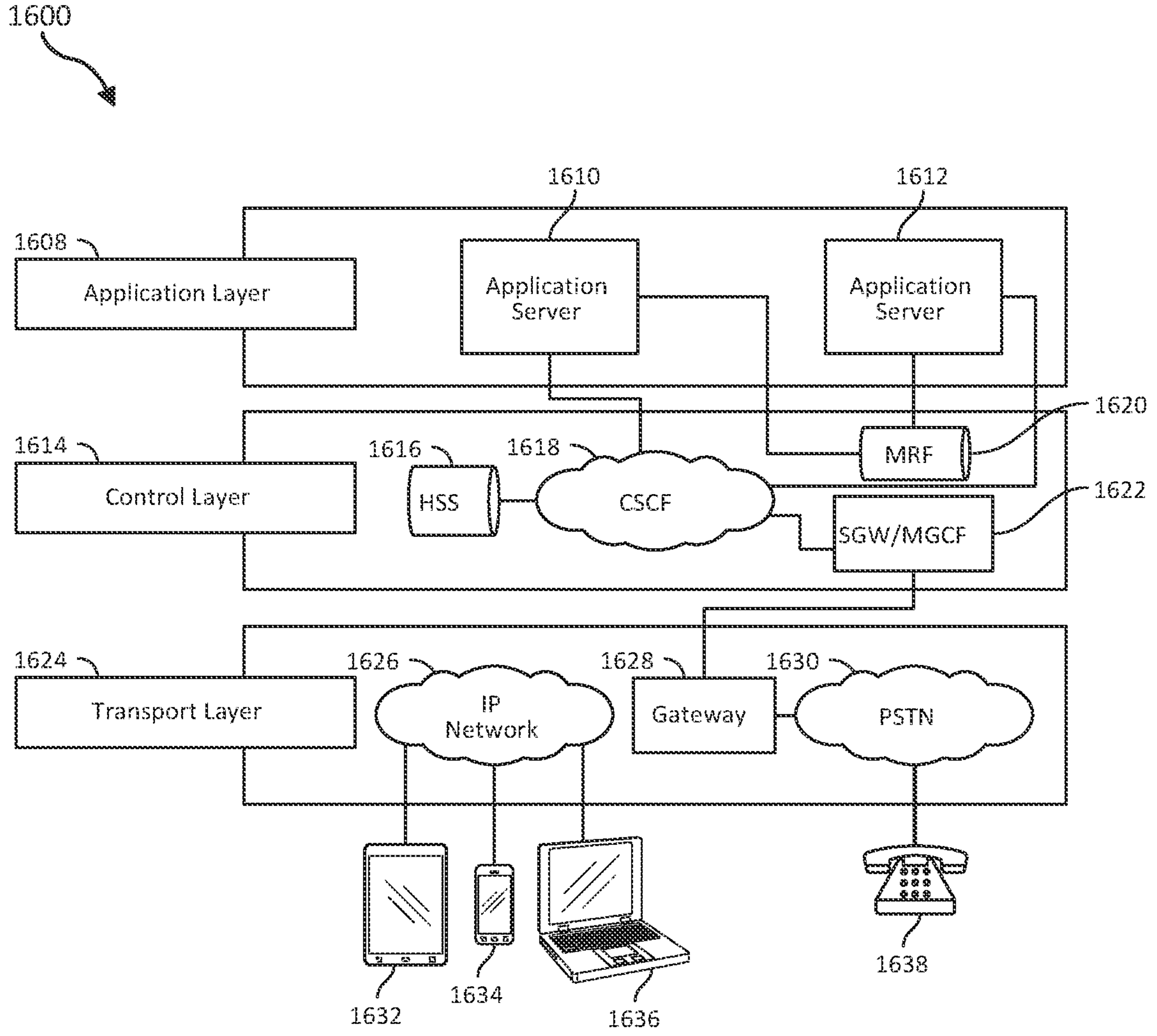
FIG. 16 shows a diagram of an Internet Protocol Multimedia Subsystem.

Additionally, or alternatively, method 100 may further involve decoding a "P-Access Network Info" packet header formatted according to the Session Initiation Protocol, which can correspond to a signaling protocol selected by the 3rd Generation Partnership Project (3GPP) to create and control multimedia sessions with multiple participants in the IP Multimedia Core Network Subsystem. By way of background, FIG. 16 shows a diagram 1600 of a framework corresponding to the IP Multimedia Core Network Subsystem. As further shown in this diagram, a tablet 1632, a smartphone 1634, and/or laptop 1636 may connect to an IP network 1626 at a transport layer 1624. Similarly, a telephone 1638 may connect to a public switched telephone network 1630 through a gateway 1628, which may further provide an interface between transport layer 1624 and a controller 1614. Control layer 1614 may include a home subscriber server 1616, a call session control function 1618, a media resource function 1620, and/or a server gateway or media gateway control function 1622. As shown, one or more of these elements within controller 1614 may interface with one or more instances of an application server, such as an application server 1610 and an application server 1612, which may be disposed within an application layer 1608.

Figure 17:
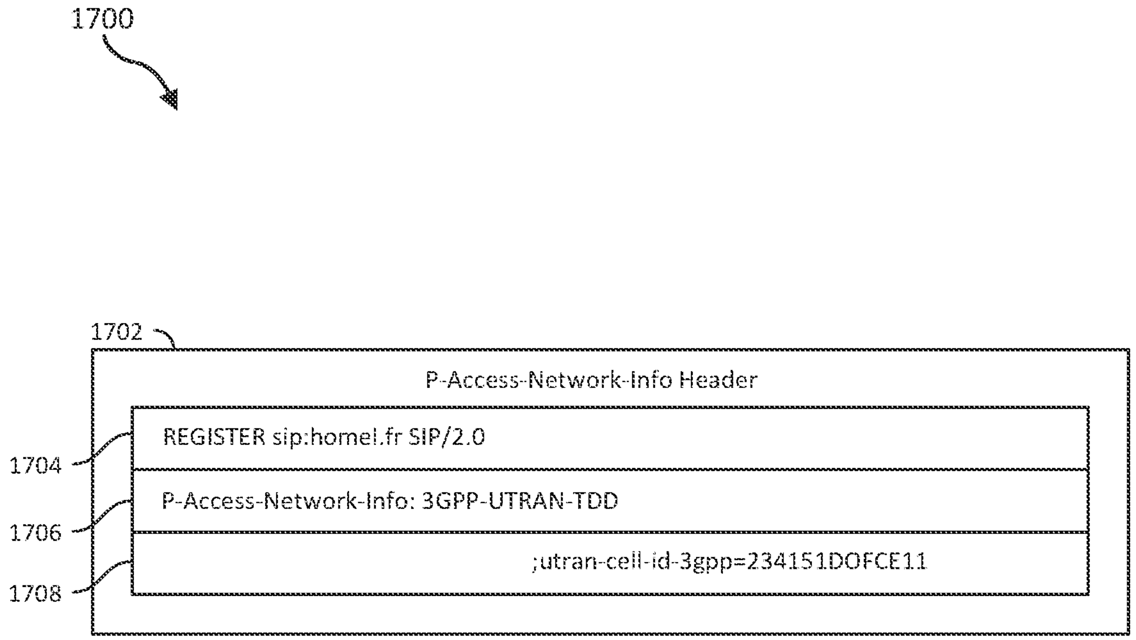
FIG. 17 shows a diagram of an illustrative example of a P-Access-Network Info Header.

As an extension or component of the IP Multimedia Core Network Subsystem, the Session Initiation Protocol may specify the format and usage of a "P-Access Network Info" packet header. FIG. 17 shows a diagram 1700 of an example packet header 1702 that is formatted as a "P-Access Network Info" packet header. Diagram 1700 may further include rows 1704-1708, which may further specify values for corresponding fields within the Session Initiation Protocol to indicate corresponding items of information that facilitate the initiation of a session for transmitting multimedia content. In the particular example of diagram 1700, row 1706 may specify "3GPP-UTRAN-TDD", which may correspond to a type of radio access technology (e.g., third generation). Other illustrative examples of radio access technology may include GERAN (e.g., second generation), EUTRAN (fourth generation), or NG-RAN (fifth generation), as understood by those having skill in the art. Accordingly, decoding packet 1702 may enable method 100 to ascertain that one particular telecommunication channel, such as UTRAN, has been established or initiated as distinct from a different communication channel, as further discussed above. Additionally, or alternatively, and more generally, method 100 may involve decoding a network packet that specifies one or more types of radio access technology as being utilized, and these types of radio access technology may include 2G, 3G, 4G, 5G, Wi-Fi, Bluetooth, and/or near-field communication, etc.

Figure 18A:
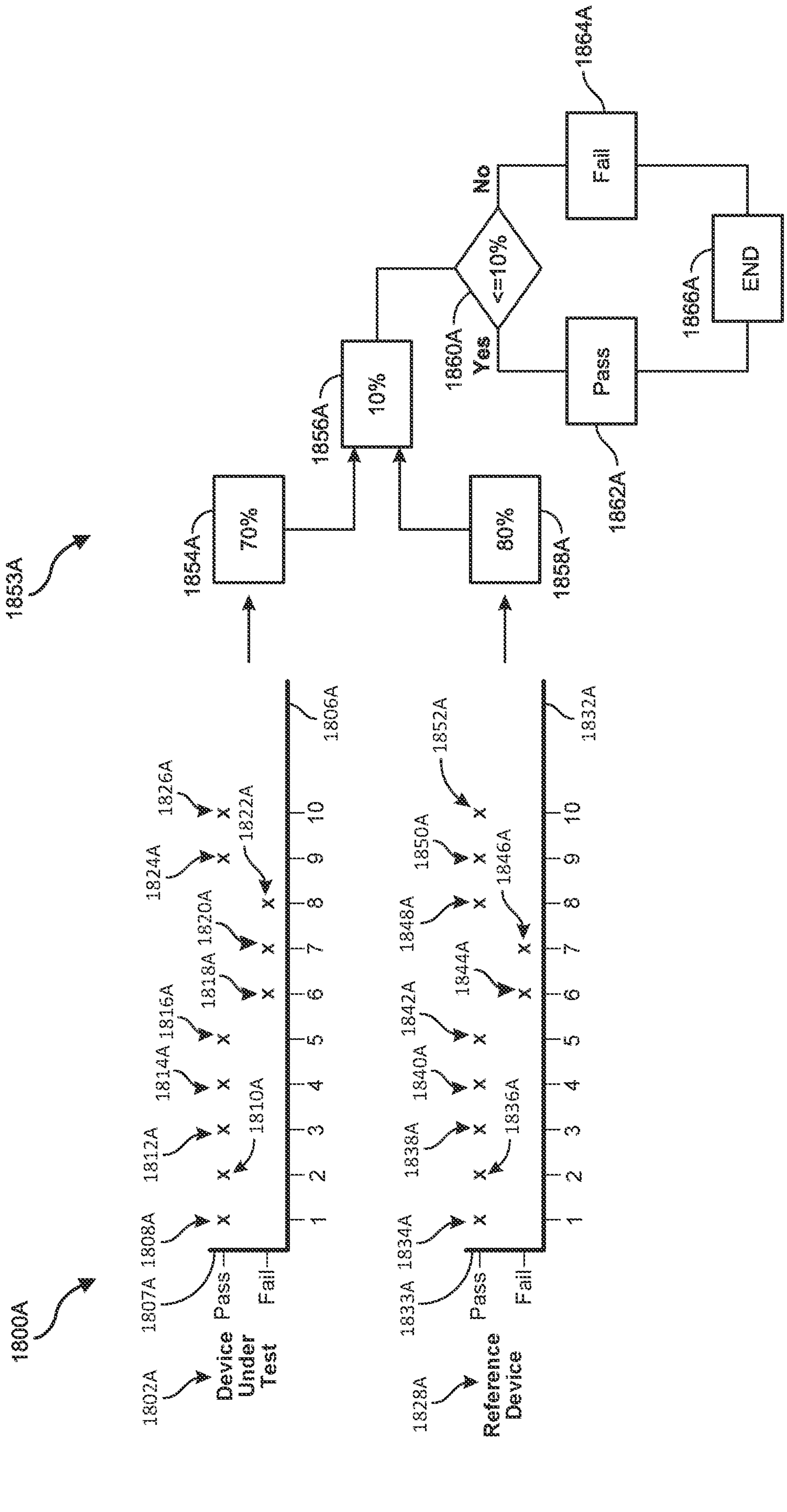
FIG. 18A shows two illustrative diagrams relating to methods that detect and report successful or failed handover procedures.

FIG. 18A shows a diagram 1800A that includes two separate charts corresponding to a device under test (1802A) and a reference device (1828A) (see also FIG. 2). As further shown, the chart for the device under test may include a vertical axis 1804A and horizontal axis 1806A, whereas the chart for the reference device may include a vertical axis 1830A and horizontal axis 1832A. As shown, both of these charts within diagram 1800A may plot 10 different data points, respectively, as points 1807A-1826A and points 1833A-1852A. These data points may correspond to different executions or instances of individual tests within the first series of communication channel handover procedures (top chart) and within the second series of communication channel handover procedures (bottom chart). Additionally, or alternatively, each one of the data points may correspond to a different execution or iteration of the performance of steps 2206-2214 of method 2200 in FIG. 22, as discussed in more detail below in connection with one embodiment.

From among these points, points 1818A-18202A correspond to "fail" whereas the remaining points in the top chart correspond to "pass," as shown. Similarly, from among these points, points 1844A and 1846A correspond to "fail" whereas the remaining points in the bottom chart correspond to "pass," as shown. In some examples, a key performance indicator is measured based on at least one of monitoring failure messages in IP Multimedia Core Network Subsystem signaling, monitoring a registered radio access technology used by an instance of user equipment, or monitoring for call drops. In other words, with respect to the point shown within diagram 1800A, an occurrence of an IP Multimedia Core Network Subsystem error code and/or an occurrence of the call drop will be labeled as a failed iteration (i.e., as one of the data points marking a failure), as shown.

Accordingly, FIG. 18A also includes a flow diagram for a method 1853A, which accepts as inputs the percentage success rate for these two charts. In particular, the success rate of 70% for the top chart is accepted as an input, at step 1854A, and the success rate of 80% for the bottom chart is accepted as an input, at step 1858A of this flow diagram. From these two success rates, a delta or difference is calculated or determined at step 1856A. Subsequently, at a decision step 1860A, this delta or difference value is compared with a threshold value. For example, the threshold or difference value may be compared to determine whether the delta is less than or equal to 10%, as shown. If the decision is yes at decision step 1860A, then method 1853 a may proceed to step 1862A, which indicates pass. Alternatively, if the decision is no at decision step 1860A, then method 1853A may proceed to a step 1864A, which indicates failure. In the particular example of this figure, the delta (10%) is within or equal to the threshold and, therefore, the device under test would pass the first series of communication channel handover procedures. At step 1866A, method 1853A may end.

The specific details and mechanical implementation of method 1853A are merely examples for the purposes of illustration. More generally, the first results of performing the first series of communication channel handover procedures may be compared with the second results of performing the second series of communication channel handover procedures. Based on this comparison, one or more policies may be applied to determine whether the first results are sufficiently close to, or sufficiently successful in comparison to, the second results, which may further indicate overall whether the device under test passes the first series of communication channel handover procedures or not, as further outlined and explained above.

Figure 18B:
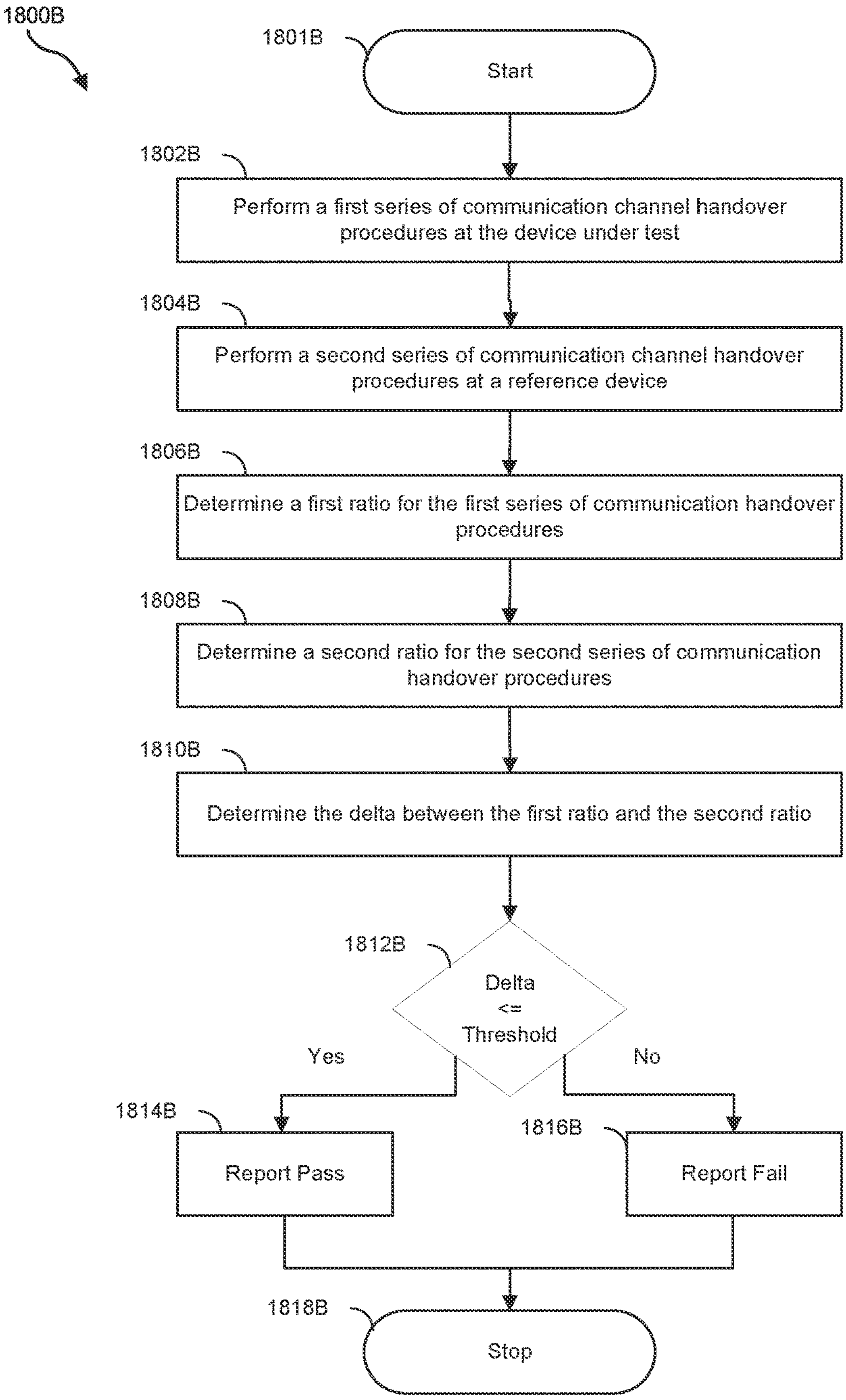
FIG. 18B shows a flow diagram for an example method for how to detect and report successful or failed handover procedures.

FIG. 18B shows a flow diagram for a method 1800B, which substantially overlaps with method 1853A, but which includes additional steps at the beginning for clarity and completeness. At step 1801B, method 1800B may start. At step 1802B, a cellular field testing tool, for example, may perform or initiate a first series of communication channel handover procedures at the device under test. At step 1804B, the cellular field testing tool may perform or initiate a second series of communication channel handover procedures at a reference device. At step 1806B, the cellular field testing tool may determine a first ratio for the first series of communication handover procedures. At step 1808B, the cellular field testing tool may determine a second ratio for the second series of communication handover procedures. Subsequently, at step 1810B, the cellular field testing tool may determine the delta between the first ratio and the second ratio. As further shown within FIG. 18B, the remaining steps 1812B-1818B are essentially similar to the concluding steps of method 1853A, as further discussed above in connection with FIG. 18A.

Figure 19:
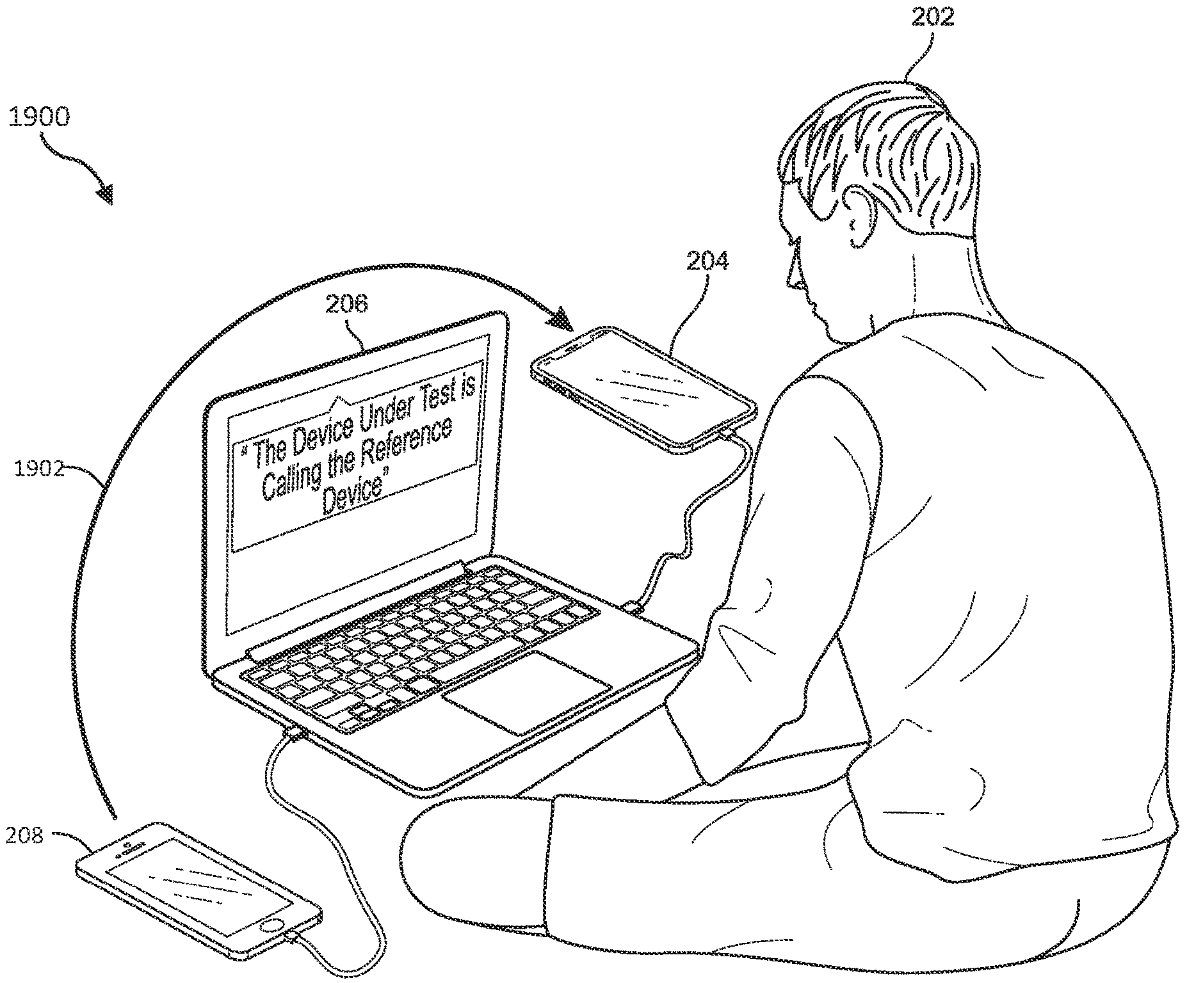
FIG. 19 shows a diagram of a device under test calling a reference device as part of testing handover procedures.

FIG. 19 shows a diagram 1900 illustrating how the device under test 208 may call the reference device 204 as a user operates a cellular field testing tool executing within a laptop 206, for example. As further shown within this figure, laptop 206 may display, on its monitor within a graphical user interface, a message to the user 202 indicating that "the device under test is calling the reference device." The call from the device under test 208 to the reference device 204 is also further indicated by an explanatory arrow 1902, as shown. The calling procedure outlined within FIG. 19 may correspond to step 2204 of method 2200 shown within FIG. 22, as discussed in more detail below.

Figure 20:
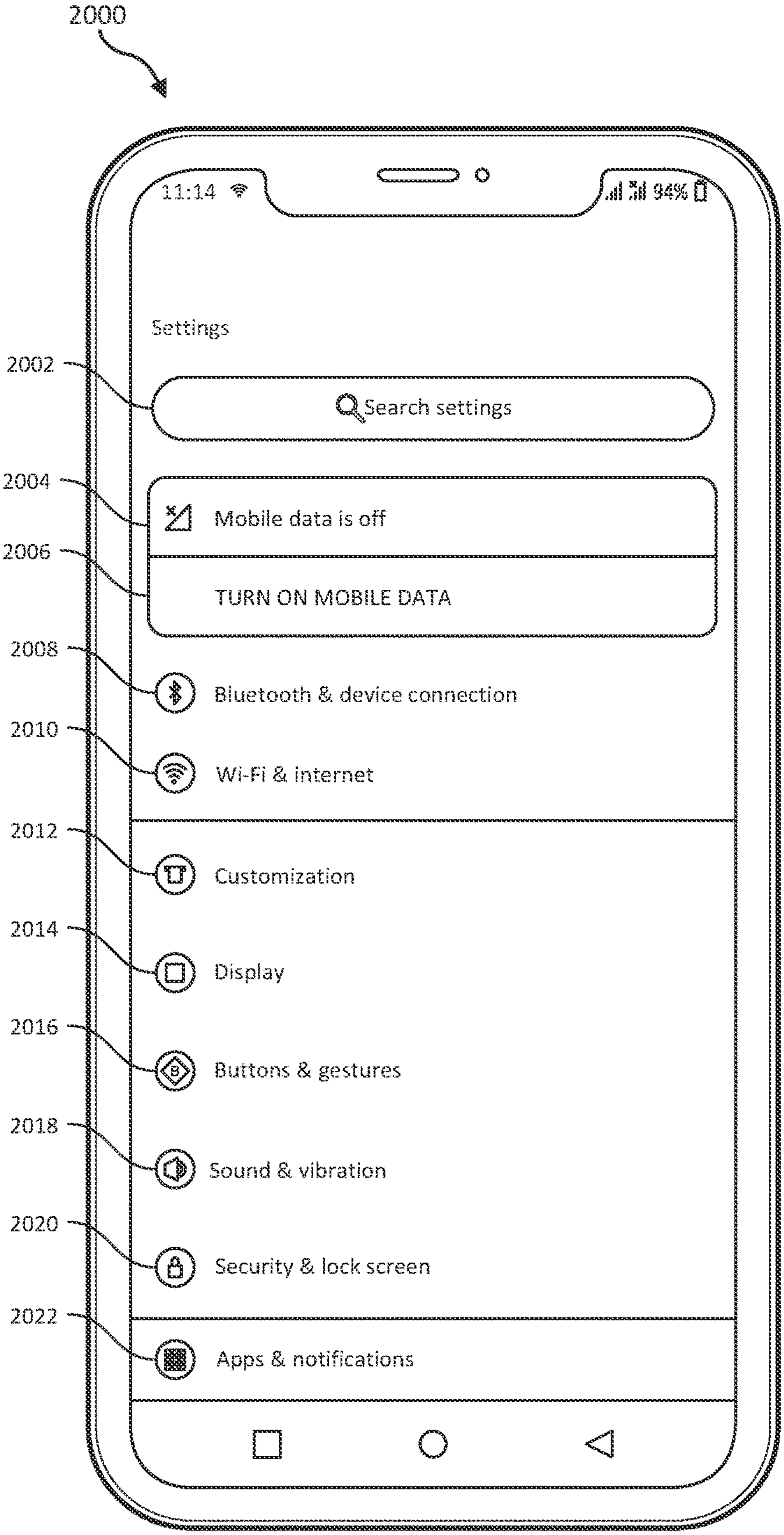
FIG. 20 shows a graphical user interface enabling a user to enable or disable mobile data.

Similarly, FIG. 20 shows a diagram 2000 of an example graphical user interface for an operating system and its settings within a mobile device, such as a smartphone, which may correspond to the device under test, as discussed above. As further shown within this figure, diagram 2000 may show a number of graphical user interface elements 2002-2022. In particular, graphical user interface element 2004 may indicate to the user that mobile data has been turned off, whereas graphical user interface element 2006 may provide a button or other user interface element enabling the user of the mobile device to "turn on mobile data." Toggling graphical user interface element 2006 to turn on mobile data may correspond to registering and/or switching over to one communication channel, as distinct from a different communication channel, as discussed at length above and as discussed in more detail regarding the embodiment of FIG. 22. Additionally, or alternatively, those having skill in the art will readily ascertain that a variation of the graphical user interface of diagram 2000 may similarly enable a user to toggle on or off a Wi-Fi connection, such as by selecting or toggling a graphical user interface element 2010 shown within FIG. 20. Accordingly, by toggling such graphical user interface elements on or off, either manually or through an automated or semiautomated procedure (e.g., an automated performance of method 2200), the user or cellular field testing tool may test how well the device under test switches between different communication channels, as further discussed above.

Figure 21:
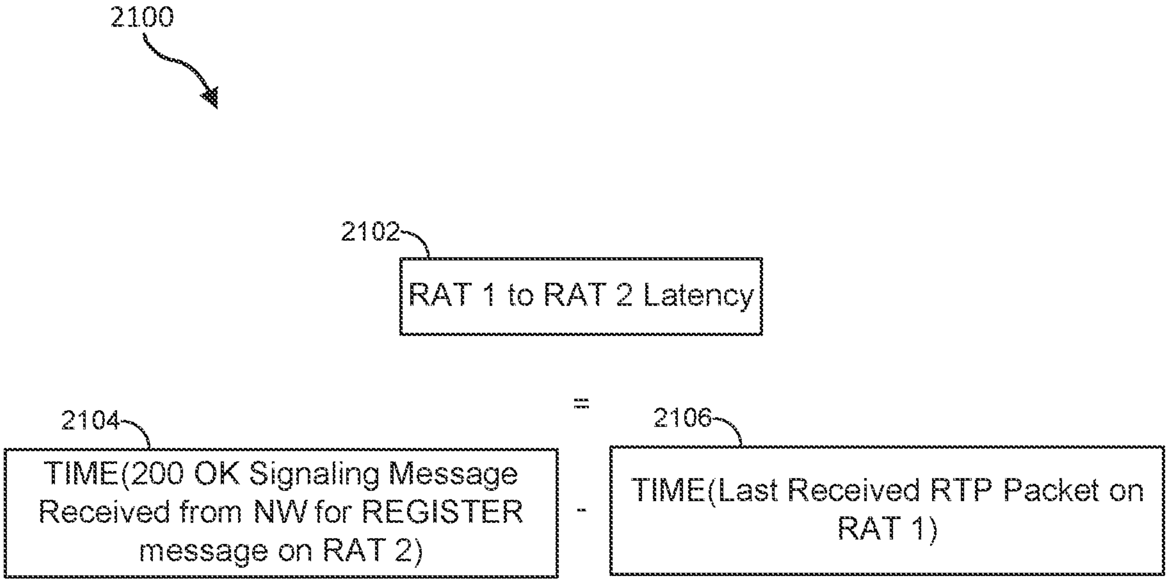
FIG. 21 shows a diagram for an equation for calculating latency.

Additionally, or alternatively, various embodiments of method 100 may not only test whether a device passes the first series of communication channel handover procedures, as further discussed above (see FIGS. 18A-18B), but may also test or measure the latency involved with switching between the two communication channels. In particular, FIG. 21 shows a mathematical equation 2100 that indicates that the latency in terms of switching from a first radio access technology (corresponding to RAT 1, which may be 5G SA or Wi-Fi) to another radio access technology (corresponding to RAT 2, which can be the opposite of whichever of 5G SA or Wi-Fi is being used at RAT 1). As further shown within equation 2100, this latency can be measured as the difference between an item 2104 of information and an item 2106 of information, where item 2104 indicates the time of receiving a 200 OK message on RAT 2 from the corresponding network and associated REGISTER message, and item 2106 indicates the time of the last received Real-Time Transfer Protocol packet on RAT 1. The corresponding latency can be reported optionally at step 2214 of method 2200 and/or otherwise reported at, or as part of, the conclusion of one or more embodiments of method 100, as further discussed below.

Figure 22:
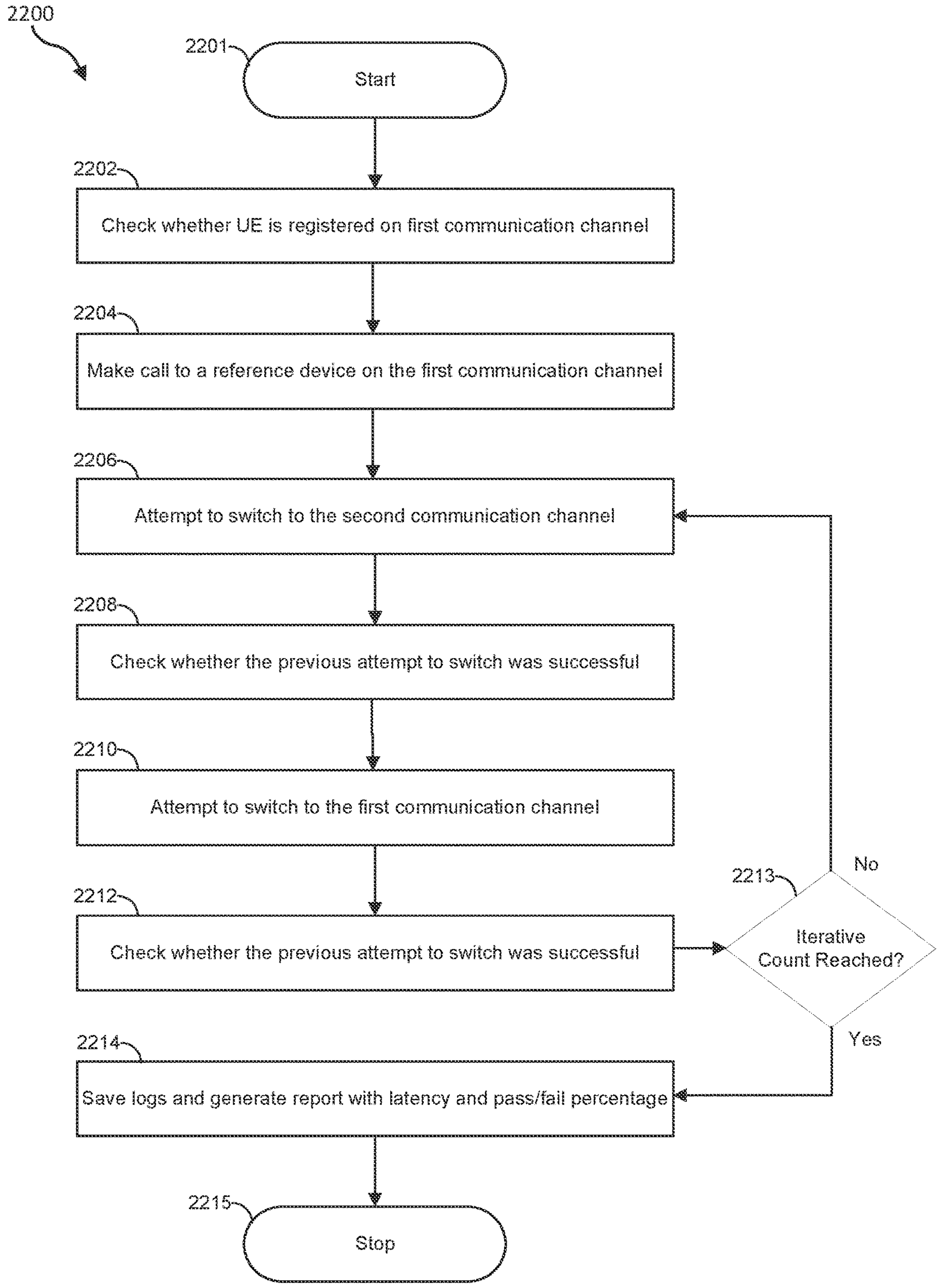
FIG. 22 shows a flow diagram for testing cellular communication channel handover.

With respect to FIG. 22, in some examples, method 100 may further involve performing the following steps: attempting to switch from the first communication channel to a second communication channel (see step 2206), checking whether the attempting to switch to the second communication channel was successful (see step 2206), attempting switching from the second communication channel to the first communication channel (see step 2210), and/or checking whether the attempt to switch to the first communication channel was successful (see step 2212). Moreover, in variations of these examples, method 100 may also further involve repeating these four steps above at least once and/or saving output results and/or generating a report with a latency measurement and/or a pass/fail percentage (see FIGS. 18A-18B).

FIG. 22 shows a flow diagram for a method 2200 that elaborates on detailed procedures for implementing method 100 in some examples. At step 2201, method 2200 may begin. At step 2202, a cellular field testing tool may check whether an item of user equipment is registered on a first communication channel, such as 5G SA. At step 2204, the cellular field testing tool and/or a user or operator may make a call to a reference device on the first communication channel (see FIG. 20). Steps 2202 and 2204 may correspond to initialization steps, whereas steps 2206-2212 may correspond to steps performed multiple times as part of looped iterations after the performance of steps 2202-2204.

At step 2206, the cellular field testing tool and/or user may attempt to switch to the second communication channel, such as Wi-Fi. Optionally, prior to the performance of step 2206, method 2200 may wait or remain idle for a specified period of time. Subsequently, at step 2208, the cellular field testing tool and/or user may check whether the previous attempt to switch to the second communication channel, such as Wi-Fi, was successful. At step 2012, the cellular field testing tool and/or user may attempt to switch to the first communication channel. As part of the performance of step 2210, the cellular field testing tool and/or the user may disable the second communication channel such as Wi-Fi. Additionally, or alternatively, the cellular field testing tool or user may also wait or remain idle for a specified period of time, similar to the performance of step 2206. At step 2212, the cellular field testing tool or the user may check whether the previous attempt to switch to the first telecommunication channel was successful. After the performance of step 2212, method 2200 may proceed to a decision step 2213, at which point the cellular field testing tool or user may determine whether an iterative count has been reached. As one illustrative example, the loop corresponding to steps 2206-2212 may be performed 10 different times as part of reaching an iterative count or threshold number of 10. Those having skill in the art will understand that this threshold number is merely illustrative and, furthermore, that any suitable number may be used to achieve the intended benefits and improvements associated with method 100, as further discussed above. Accordingly, steps 2206-2212 may be performed in a loop, corresponding to decision step 2213, until the iterative count has been reached, at which point method 2200 may proceed to a step 2214, at which point the cellular field testing tool may save logs and/or generate a report with the latency information (see FIG. 21) and/or the pass/fail rate (see FIGS. 18A-18B). Subsequently, at step 2215, method 2200 may stop or conclude.

Figure 23:
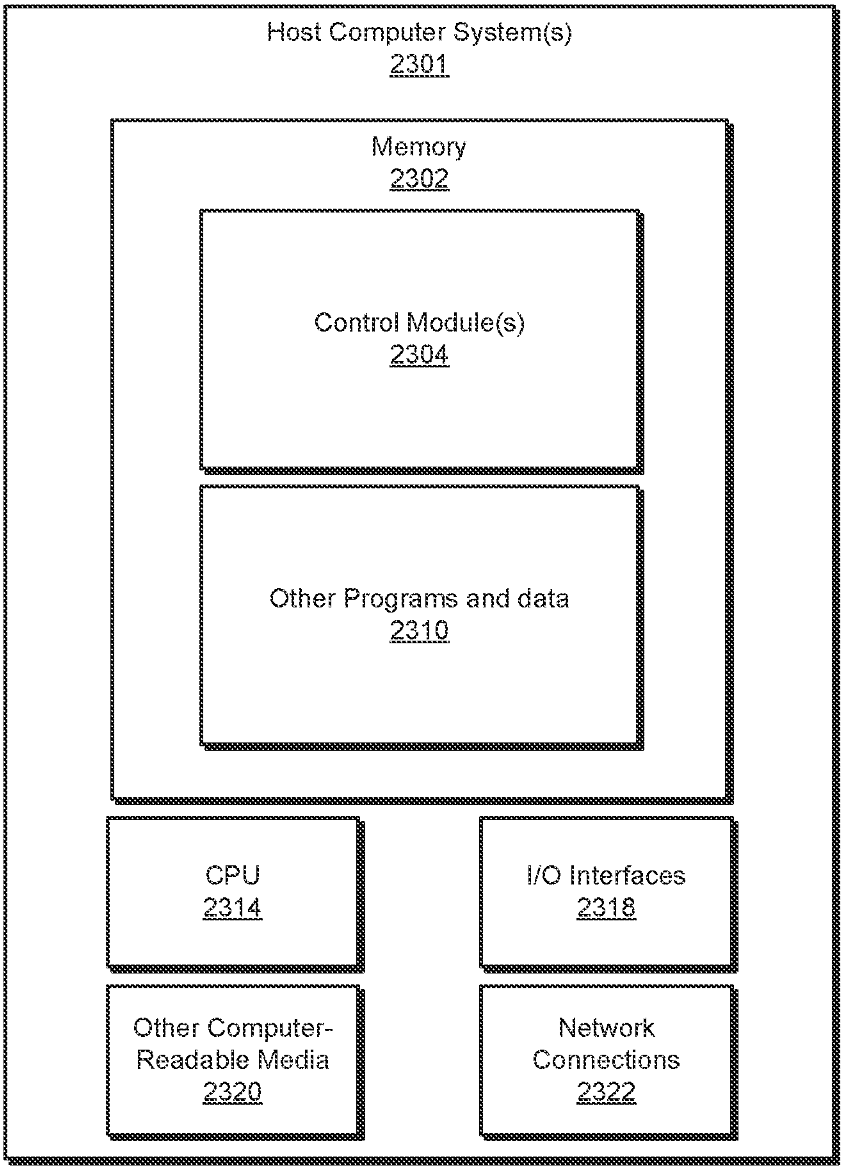
FIG. 23 shows a diagram of an example computing system that may facilitate the performance of one or more of the methods described herein.

FIG. 23 shows a system diagram that describes an example implementation of a computing system(s) for implementing embodiments described herein. The functionality described herein can be implemented either on dedicated hardware, as a software instance running on dedicated hardware, or as a virtualized function instantiated on an appropriate platform, e.g., a cloud infrastructure. In some embodiments, such functionality may be completely software-based and designed as cloud-native, meaning that they are agnostic to the underlying cloud infrastructure, allowing higher deployment agility and flexibility. However, FIG. 23 illustrates an example of underlying hardware on which such software and functionality may be hosted and/or implemented.

In particular, shown is example host computer system(s) 2301. For example, such computer system(s) 2301 may execute a scripting application, or other software application, as further discussed above, and/or to perform one or more of the other methods described herein. In some embodiments, one or more special-purpose computing systems may be used to implement the functionality described herein. Accordingly, various embodiments described herein may be implemented in software, hardware, firmware, or in some combination thereof. Host computer system(s) 2301 may include memory 2302, one or more central processing units (CPUs) 2314, I/O interfaces 2318, other computer-readable media 2320, and network connections 2322.

Memory 2302 may include one or more various types of non-volatile and/or volatile storage technologies. Examples of memory 2302 may include, but are not limited to, flash memory, hard disk drives, optical drives, solid-state drives, various types of random access memory (RAM), various types of read-only memory (ROM), neural networks, other computer-readable storage media (also referred to as processor-readable storage media), or the like, or any combination thereof. Memory 2302 may be utilized to store information, including computer-readable instructions that are utilized by CPU 2314 to perform actions, including those of embodiments described herein.

Memory 2302 may have stored thereon control module(s) 2304. The control module(s) 2304 may be configured to implement and/or perform some or all of the functions of the systems or components described herein. Memory 2302 may also store other programs and data 2310, which may include rules, databases, application programming interfaces (APIs), software containers, nodes, pods, clusters, node groups, control planes, software defined data centers (SDDCs), microservices, virtualized environments, software platforms, cloud computing service software, network management software, network orchestrator software, network functions (NF), artificial intelligence (AI) or machine learning (ML) programs or models to perform the functionality described herein, user interfaces, operating systems, other network management functions, other NFs, etc.

Network connections 2322 are configured to communicate with other computing devices to facilitate the functionality described herein. In various embodiments, the network connections 2322 include transmitters and receivers (not illustrated), cellular telecommunication network equipment and interfaces, and/or other computer network equipment and interfaces to send and receive data as described herein, such as to send and receive instructions, commands and data to implement the processes described herein. I/O interfaces 2318 may include a video interface, other data input or output interfaces, or the like. Other computer-readable media 2320 may include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method comprising:

initiating a cellular field testing tool that tests a condition of cellular network connectivity of a device under test;

detecting first results of performing a first series of communication channel handover procedures at the device under test;

detecting second results of performing a second series of communication channel handover procedures at a reference device; and outputting, by the cellular field testing tool, an indication of whether the device under test passed or failed the first series of communication channel handover procedures at least in part by comparing the first results of the first series of communication channel handover procedures at the device under test with the second results of the second series of communication channel handover procedures at the reference device;

wherein the first series of communication channel handover procedures comprises:

attempting to switch from a first communication channel to a second communication channel;

checking whether the attempting to switch to the second communication channel was successful;

attempting to switch from the second communication channel to the first communication channel; and checking whether the attempting to switch to the first communication channel was successful.

2. The method of claim 1, wherein the first series of communication channel handover procedures or the second series of communication channel handover procedures involve handover procedures between Wi-Fi and another communication channel.

3. The method of claim 1, wherein the first series of communication channel handover procedures or the second series of communication channel handover procedures involve handover procedures between new radio and another communication channel.

4. The method of claim 1, wherein decoding a packet header to identify a type of radio access technology acts as a start criterion for beginning the first series of communication channel handover procedures.

5. The method of claim 1, wherein a key performance indicator is measured based on at least one of monitoring failure messages in IP Multimedia Core Network Subsystem signaling, monitoring a registered radio access technology used by an instance of user equipment, or monitoring for call drops.

6. The method of claim 1, wherein at least one instance within the first series of communication channel handover procedures is labeled as a failure upon detecting either a call drop or an occurrence of an IP Multimedia Core Network Subsystem error code.

7. The method of claim 1, wherein outputting, by the cellular field testing tool, the indication of whether the device under test passed or failed comprises comparing a first ratio indicating failed iterations within the first series of communication channel handover procedures and a second ratio indicating failed iterations within the second series of communication channel handover procedures.

8. The method of claim 7, wherein outputting, by the cellular field testing tool, the indication of whether the device under test passed or failed comprises detecting whether the first ratio is within a threshold percent from the second ratio.

9. The method of claim 1, wherein the device under test comprises a smartphone.

10. The method of claim 1, further comprising saving output results and generating a report with a latency measurement and a pass/fail percentage.

11. A system comprising:

a physical computing processor; and a non-transitory computer-readable medium encoding instructions that, when executed by the physical computing processor, cause the physical computing processor to perform operations comprising:

initiating a cellular field testing tool that tests a condition of cellular network connectivity of a device under test;

detecting first results of performing a first series of communication channel handover procedures at the device under test;

detecting second results of performing a second series of communication channel handover procedures at a reference device; and outputting, by the cellular field testing tool, an indication of whether the device under test passed or failed the first series of communication channel handover procedures at least in part by comparing the first results of the first series of communication channel handover procedures at the device under test with the second results of the second series of communication channel handover procedures at the reference device;

wherein the first series of communication channel handover procedures comprises:

attempting to switch from a first communication channel to a second communication channel;

checking whether the attempting to switch to the second communication channel was successful;

attempting to switch from the second communication channel to the first communication channel; and checking whether the attempting to switch to the first communication channel was successful.

12. The system of claim 11, wherein the system is configured such that the first series of communication channel handover procedures or the second series of communication channel handover procedures involve handover procedures between Wi-Fi and another communication channel.

13. The system of claim 11, wherein the system is configured such that the first series of communication channel handover procedures or the second series of communication channel handover procedures involve handover procedures between new radio and another communication channel.

14. The system of claim 11, wherein the system is configured such that decoding a packet header to identify a type of radio access technology acts as a start criterion for beginning the first series of communication channel handover procedures.

15. The system of claim 11, wherein the system is configured such that a key performance indicator is measured based on at least one of monitoring failure messages in IP Multimedia Core Network Subsystem signaling, monitoring a registered radio access technology used by an instance of user equipment, or monitoring for call drops.

16. The system of claim 11, wherein the system is configured such that at least one instance within the first series of communication channel handover procedures is labeled as a failure upon detecting either a call drop or an occurrence of an IP Multimedia Core Network Subsystem error code.

17. The system of claim 11, wherein the system is configured such that outputting, by the cellular field testing tool, the indication of whether the device under test passed or failed comprises comparing a first ratio indicating failed iterations within the first series of communication channel handover procedures and a second ratio indicating failed iterations within the second series of communication channel handover procedures.

18. The system of claim 17, wherein the system is configured such that outputting, by the cellular field testing tool, the indication of whether the device under test passed or failed comprises detecting whether the first ratio is within a threshold percent from the second ratio.

19. The system of claim 11, wherein the device under test comprises a smartphone.

20. A non-transitory computer-readable medium encoding instructions that, when executed by at least one physical processor of a computing device, cause the computing device to perform operations comprising:

initiating a cellular field testing tool that tests a condition of cellular network connectivity of a device under test;

detecting first results of performing a first series of communication channel handover procedures at the device under test;

detecting second results of performing a second series of communication channel handover procedures at a reference device; and outputting, by the cellular field testing tool, an indication of whether the device under test passed or failed the first series of communication channel handover procedures at least in part by comparing the first results of the first series of communication channel handover procedures at the device under test with the second results of the second series of communication channel handover procedures at the reference device;

wherein the first series of communication channel handover procedures comprises:

attempting to switch from a first communication channel to a second communication channel;

checking whether the attempting to switch to the second communication channel was successful;

attempting to switch from the second communication channel to the first communication channel; and checking whether the attempting to switch to the first communication channel was successful.

* * * * *